(12) United States Patent
Iwanabe et al.

(10) Patent No.: US 8,406,093 B2
(45) Date of Patent: Mar. 26, 2013

(54) THERMAL-ASSISTED-MAGNETIC-RECORDING HEAD HAVING A HIGH REFRACTIVE INDEX CORE AND MULTIPLE THIN FILM CORES, AND MAGNETIC RECORDING SYSTEM USING THE THERMAL-ASSISTED-MAGNETIC-RECORDING HEAD

(75) Inventors: Yasuhiko Iwanabe, Kodaira (JP);
Takuya Matsumoto, Hachioji (JP);
Junichiro Shimizu, Hadano (JP);
Harukazu Miyamoto,
Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 12/903,276

(22) Filed: Oct. 13, 2010

(65) Prior Publication Data

US 2011/0090770 A1 Apr. 21, 2011

(30) Foreign Application Priority Data

Oct. 15, 2009 (JP) .................................. 2009-238187

(51) Int. Cl.
*G11B 11/00* (2006.01)
(52) U.S. Cl. .................................. 369/13.33; 369/13.13
(58) Field of Classification Search ................ 369/13.33,
369/13.13, 13.32, 13.02, 112.09, 112.14,
369/112.21, 112.27, 300; 360/59; 385/129,
385/31, 88–94; 29/607; 250/201.3, 201.5
See application file for complete search history.

(56) References Cited

U.S. PATENT DOCUMENTS

| 6,950,598 B1 | 9/2005 | Tawa et al. | |
|---|---|---|---|
| 2003/0081902 A1* | 5/2003 | Blauvelt et al. | 385/50 |
| 2007/0159720 A1* | 7/2007 | Sohn et al. | 360/128 |

(Continued)

FOREIGN PATENT DOCUMENTS

| JP | 2006-73105 | 3/2006 |
|---|---|---|
| JP | 2007-257753 | 10/2007 |

(Continued)

OTHER PUBLICATIONS

Tim Rausch et al., Near Field Heat Assisted Magnetic Recording with a Planar Solid Immersion Lens, Japanese Journal of Applied Physics, 2006, pp. 1314-1320, vol. 45, No. 2B.

(Continued)

*Primary Examiner* — Tan X Dinh
(74) *Attorney, Agent, or Firm* — Antonelli, Terry, Stout & Kraus, LLP.

(57) ABSTRACT

Provided is a thermal-assisted-magnetic-recording head capable of directing, to a magnetic recording medium, light in which the spot size is reduced to submicron order with high total optical propagation efficiency. A light coupling unit that guides light emitted from the light source into a magnetic head and a high-refractive-index core that couples with the light guided by the light coupling unit to lead the light to an air bearing surface are arranged in the magnetic head. The light coupling unit includes a plurality of thin-film-like cores that are separated from each other by a clad material. An upper part of the high-refractive-index core is placed between two thin-film-like cores.

14 Claims, 31 Drawing Sheets

U.S. PATENT DOCUMENTS

| | | |
|---|---|---|
| 2008/0316872 A1 | 12/2008 | Shimizu et al. |
| 2009/0168220 A1* | 7/2009 | Komura et al. ............... 360/59 |
| 2009/0185459 A1 | 7/2009 | Matsumoto |
| 2010/0002330 A1* | 1/2010 | Lille ............................ 360/59 |
| 2010/0111126 A1 | 5/2010 | Shimizu et al. |
| 2010/0157745 A1* | 6/2010 | Okada et al. ............ 369/13.02 |
| 2011/0038235 A1 | 2/2011 | Matsumoto et al. |
| 2011/0199867 A1* | 8/2011 | Stipe ...................... 369/13.24 |
| 2011/0235478 A1* | 9/2011 | Komura et al. ......... 369/13.24 |
| 2012/0014230 A1* | 1/2012 | Hara et al. .............. 369/13.33 |
| 2012/0026846 A1* | 2/2012 | Komura et al. ......... 369/13.33 |
| 2012/0182842 A1* | 7/2012 | Iwanabe et al. ......... 369/13.17 |

FOREIGN PATENT DOCUMENTS

| | | |
|---|---|---|
| JP | 2008-204586 | 9/2008 |
| JP | 2009-170053 | 7/2009 |
| JP | 2011086338 A * | 4/2011 |
| WO | WO 2009/096471 A1 | 8/2009 |

OTHER PUBLICATIONS

Vilson R. Almeida et al., Nanotaper for compact mode conversion, Optics Letters, Aug. 1, 2003, pp. 1302-1304, vol. 28, No. 15.

* cited by examiner

THERMAL-ASSISTED-MAGNETIC-RECORDING HEAD HAVING A HIGH REFRACTIVE INDEX CORE AND MULTIPLE THIN FILM CORES, AND MAGNETIC RECORDING SYSTEM USING THE THERMAL-ASSISTED-MAGNETIC-RECORDING HEAD

CLAIM OF PRIORITY

The present application claims priority from Japanese patent application JP 2009-238187 filed on Oct. 15, 2009, the content of which is hereby incorporated by reference into this application.

BACKGROUND OF THE INVENTION

1. Field of the Invention

The present invention related to a magnetic head used in thermal-assisted magnetic recording and a magnetic recording system including the magnetic head.

2. Background Art

The information recording density of magnetic recording systems continues to increase, and the size of magnetic recording marks of 1 bit continues to be smaller. In the magnetic recording systems, the miniaturization of the recording bit size is mainly attained by the miniaturization of the size of the recording magnetic head and the miniaturization of the magnetic particles of the magnetic recording medium. However, it is feared that the magnetization information recorded in the magnetic recording medium disappears in a short time at room temperature due to thermal fluctuation when the recording density is over about 1 Tbit/inch$^2$. To prevent this, the coercive force of the magnetic recording medium needs to be increased. However, there is a limit to the intensity of the magnetic field that can be generated from the magnetic recording head. Therefore, the recording bit cannot be formed in the medium if the coercive force is increased too much. To solve this, a thermal-assisted magnetic recording system that allows recording to the high coercive force medium by heating the medium at the moment of recording to reduce the coercive force is drawing attention in recent years. So far, a method for realizing the high recording density by emitting a minute light spot on the medium at high power density to locally heat only the recording area is proposed as the thermal-assisted magnetic recording system.

A lens is typically used to generate the minute light spot, and in recent years, the distance between the magnetic head and the magnetic recording medium is 10 nm or less. If the weight increases by mounting an optical element, such as the lens, on the magnetic head, the weight causes a problem that the magnetic recording head touches the magnetic recording medium or that the head cannot fly. A plurality of magnetic recording media (disks) are laminated in the magnetic recording system, and the intervals between the magnetic recording media are usually 1 mm or less. Therefore, the height of all components installed around the magnetic head need to be within 1 mm. Therefore, it is not preferable to mount an optical element, such as a large lens used in an optical disk recording/reproducing apparatus, on the magnetic head.

An example of a method of generating a minute light spot on the magnetic recording medium without using a lens, etc. includes a method of forming a waveguide including a core and a clad in the magnetic head. The method can be realized by forming a core having a width and a thickness of submicron order by a high-refractive-index material. In Japanese Journal of Applied Physics, Vol. 45, No. 2B, 2006, pp. 1314-1320, an optical waveguide called Planer Solid Immersion Mirror is used in which the width of the core is circularly narrowed down toward the propagation direction of light. However, a grating is used to couple the incident light to the optical waveguide, and a light propagation loss is feared due to an optical axis misalignment of the incident light. In Optics Letters, Vol. 28, No. 15, 2003, pp. 1302-1304, an optical waveguide, in which a core in the size of several dozen nm is thickened in a taper shape toward the propagation direction of light, is used to couple light with a relatively large spot size to the optical waveguide. The spot size is reduced to submicron order, while the light is propagated in the optical waveguide. In JP2007-257753A, the taper-shaped core is used to form the optical waveguide in the magnetic head.

SUMMARY OF THE INVENTION

The spot size of the light entering the optical waveguide is widely spread to 6 μm or more in the magnetic head in which it is difficult to include an optical element such as a large lens. Therefore, the coupling efficiency with the incident light is low when only the optical waveguide made of the taper-shaped core (hereinafter, called "taper-shaped core") is used. As a result, although a minute light spot can be emitted to the magnetic recording medium, it is difficult to sufficiently heat the medium because the light power is weak. Heating is possible if the incident light power is increased. However, the power consumption of the magnetic recording system and the temperature in the system increase because the energy consumption and heat generation of the light source are increased. Particularly, the increase in the temperature causes degradation in the performance of the magnetic recording system.

Therefore, there can be a method of preventing the reduction in the total optical propagation efficiency by arranging, on the light incident side of the taper-shaped core, another optical waveguide (hereinafter, called "incident side optical waveguide") capable of efficient coupling and propagation of light with a large spot size. Hereinafter, the optical waveguide including the incident side optical waveguide and the taper-shaped core will be called a "spot size converter".

The optical waveguide capable of coupling and propagation of the light with a large spot size can be realized by setting the refractive index of the core material so as to reduce the refractive index difference (hereinafter called "Δn") with the clad and by increasing the core size when a typical square shaped core is used. In JP2007-257753A, a spot size converter including a core with small Δn and the taper-shaped core is used. However, obviously, there is a problem that the light coupling loss increases between the incident side optical waveguide and the taper-shaped core if the spot size of light that can propagate through the incident side optical waveguide is increased too much, although the coupling efficiency between the incident light and the incident side wave guide improves.

Therefore, to further improve the total optical propagation efficiency of the spot size converter, a mechanism capable of highly efficient coupling with the incident light and highly efficient optical coupling with the taper-shaped core is required for the incident side optical waveguide.

The characteristics required for the spot size converter is not only the improvement in the total optical propagation efficiency, and it is also important that the light power ultimately emitted from the spot size converter does not change. This is because if the light power changes in the thermal-assisted magnetic recording, the temperature of the magnetic recording medium also changes, and stable recording is difficult. The light power changes not only when the power of light entering the spot size converter changes, but also when the spot size converter is a multi mode waveguide including a plurality of propagation light paths inside.

A graph of FIG. 2 shows a result of calculation of the waveguide length dependency of the power of light directed from a multi mode waveguide and a single mode waveguide with only one light path. The light power in the optical waveguide is standardized by setting the light power at the entrance of the optical waveguide as 100%. It can be recognized from FIG. 2 that the light power changes only about ±1.0% depending on the length of the optical waveguide in the case of the single mode waveguide and that the light power changes about ±14% depending on the length in the case of the multi mode. The reason is that the lights traveling through the light paths interfere each other (intermode interference) in the multi mode waveguide. In the multi mode waveguide, a higher order mode may be excited by a change in the light power profile of the incident light, and more complicated intermode interference may be generated in the optical waveguide. The change in the power profile of the incident light occurs because a change in the environment (temperature and vibration) in the magnetic recording system changes the characteristics of the light source. The single mode waveguide is required to reduce the change in the light power.

However, the realization of the single mode is difficult in the incident side optical waveguide where coupling with light with a large spot size is required. This is because $\Delta n$ needs to be 0.01 or less, which is significantly small, to realize the single mode waveguide capable of stable coupling and propagation of the light with a large spot size. For example, to realize the single mode waveguide capable of coupling and propagation of light with more than 4 µm spot size, $\Delta n$ needs to be 0.009 or less if a typical square shaped core is used. However, if a sputtering method used in an existing magnetic head manufacturing process is used, it is difficult to manufacture $\Delta n$ of the core material and the clad material with accuracy of 0.01 or less. The manufacturing is possible if an FHD (Flame Hydrolysis Deposition) method, an MCVD (Modified Chemical Vapor Deposition) method, a VAD (Vapor phase Axial Deposition) method, etc. are used. However, the base material needs to be heated to several hundred degrees, and there is a problem that the magnetic reproducing head in the magnetic head is destroyed by heat if the methods are implemented in the magnetic head manufacturing process.

Therefore, an incident side optical waveguide capable of coupling and propagation of light with a large spot size in the single mode even if $\Delta n$ is 0.01 or more, which is large, needs to be formed.

An object of the present invention is to provide a mechanism capable of directing light, in which a spot size is reduced to submicron order, to a magnetic recording medium with high total optical propagation efficiency in a magnetic recording system including a small, light optical element on a magnetic head.

To attain the object, a light source is arranged on a magnetic head upper surface, and a spot size converter with a combination of a light coupling unit and a core made of a high refractive index material is formed in a magnetic head as an example in the present invention. The magnetic head upper surface denotes a surface opposite a surface on which an air bearing surface (ABS) of the magnetic head is formed.

The light coupling unit of the spot size converter includes, for example, two cores with small thickness or width (hereinafter, called "thin-film-like core"), and the cores are covered by a clad material with lower refractive index than the core material. The thin-film-like cores are formed to extend from the magnetic head upper surface to the bottom surface. The thickness of the thin-film-like cores is thinner than the thickness that may generate a mode in which light propagating along the cores significantly exudes from the cores. The thin-film-like cores have a mode in which light propagating along the cores significantly exudes from the cores. Therefore, light with a large spot size can be coupled and propagated. The width, the thickness, and the refractive index of the cores are adjusted so that the thin-film-like cores are in a single mode. The thin-film-like cores can realize the single mode even if the refractive index difference is relatively large. If a plurality of thin-film-like cores are formed on the side of an incident plane of light (magnetic head upper surface), the light can be coupled to the thin-film-like cores. Therefore, the light emitted from the light source can be propagated toward a magnetic head bottom surface direction with high use efficiency. Since the thin-film-like cores are in the single mode, the light can be propagated in the direction of the magnetic head bottom surface without a fluctuation of the light power. To prevent excessive light propagated through the thin-film-like cores from being directed to the magnetic recording medium, the length of the thin-film-like cores is set so that the cores do not reach the bottom surface of the magnetic head.

A core material with higher refractive index than the thin-film-like cores is used for a core of the spot size converter made of a high refractive index material (hereinafter, called "high-refractive-index core"), and the size (width and thickness) of the core is submicron order. The high-refractive-index core is covered by a clad material with lower refractive index than the core material. The high-refractive-index core is formed to extend from the magnetic head bottom surface to the upper surface, and part of the core is formed to pass through two thin-film-like cores of the light coupling unit. The size of the core becomes smaller toward the magnetic head upper surface. In this way, the light propagated through the thin-film-like core can be coupled to the high-refractive-index core. Therefore, the light propagated from the light coupling unit can be efficiently coupled with the high-refractive-index core. The light propagated through the high-refractive-index core is ultimately emitted from the magnetic head bottom surface portion as light with a spot size of submicron order.

As described, the light emitted from the light source arranged on the magnetic head upper surface can be inputted to the spot size converter to propagate the light to the magnetic head bottom surface with high use efficiency and in a single mode to emit the light of submicron order from the magnetic head bottom surface toward the magnetic recording medium.

The thin-film-like cores of the light coupling unit can be manufactured so that a value of core width×core thickness× $\Delta n$ is from 0.015 to 0.045 µm². In this case, $\Delta n$ equals to (refractive index of core material of thin-film-like core)−(refractive index of clad material). The thin-film-like cores manufactured within the range can propagate the light in the single mode without significantly changing the light propagation characteristics even if there is a core manufacturing error.

The maximum total optical propagation efficiency can be attained by setting the intervals between the thin-film-like cores of the light coupling unit and the high-refractive-index core within a range of ±20% of a half of a half width of the spot size of the light propagated along the thin-film-like cores.

To further improve the total optical propagation efficiency, there may be three or more thin-film-like cores of the light coupling unit, and the high-refractive-index core can be formed between any two thin-film-like cores. This is because light coupled and propagated through a thin-film-like core at a distant location can also be coupled to the high-refractive-index core.

To further improve the total optical propagation efficiency, at least one of the width, the thickness, and the refractive index can be made smaller in thin-film-like cores at locations farther from the high-refractive-index core. This is because, as described, since the intervals between the thin-film-like cores and the high-refractive-index core need to be within the range of ±20% of a half of a half width of the spot size of the light propagated along the thin-film-like cores to obtain the maximum use efficiency, the spot size of the light propagating along the thin-film-like cores farther from the high-refractive-index core needs to be larger than that of the inner thin-film-like cores. The enlargement of the propagating spot size can be realized by reducing at least one of the width, the thickness, and Δn of the thin-film-like cores. It is preferable that the number of thin-film-like cores is less than six. This is because an improvement in the total optical propagation efficiency cannot be expected even if there are more than six thin-film-like cores.

A plurality of thin-film-like cores may be formed only above or below the high-refractive-index core. In this case too, at least one of the width, the thickness, and Δn of the thin-film-like cores farther from the high-refractive-index core can be adjusted to be smaller than those of the closer thin-film-like cores.

According to the present invention, light with a spot size of submicron order can be directed to a magnetic recording medium with high total optical propagation efficiency and less light power change.

DETAILED DESCRIPTION OF THE PREFERRED EMBODIMENTS

Hereinafter, embodiments of the present invention will be described with reference to the drawings.

First Embodiment

Figure 1:
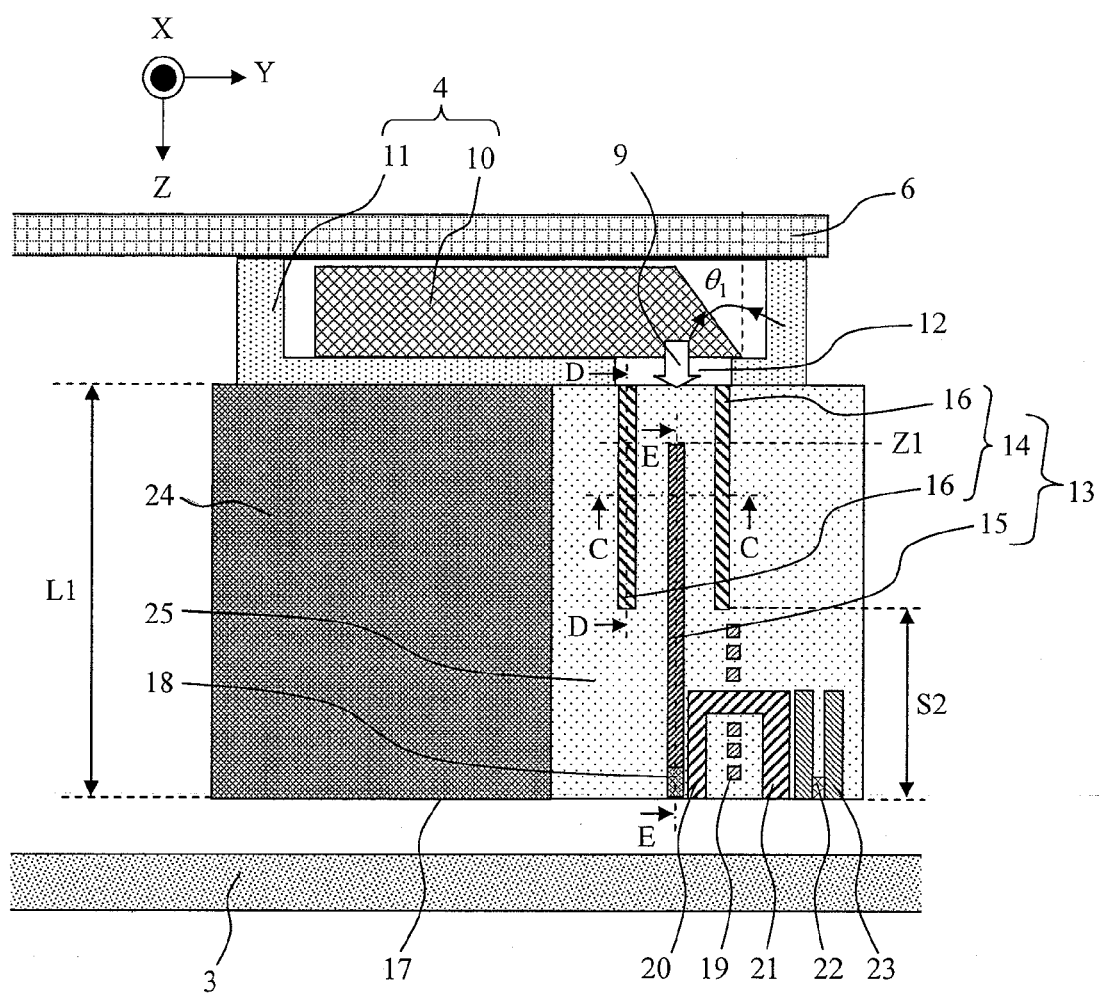
FIG. 1 is a cross-sectional side view showing an example of a magnetic head including a spot size converter of the present invention.
Figure 2:
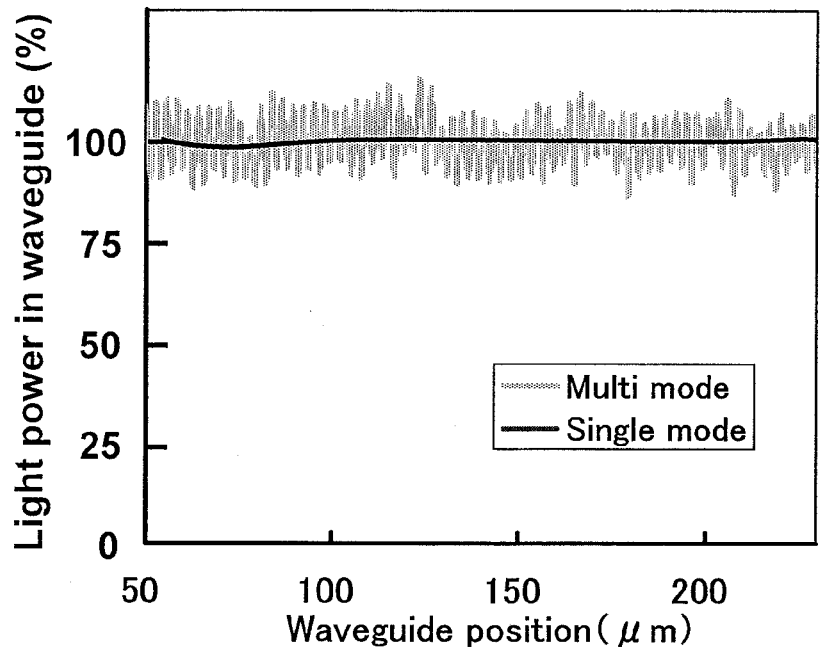
FIG. 2 is a diagram showing a relationship between the power of light directed from a multi mode waveguide and a single mode waveguide and the waveguide length.
Figure 3:
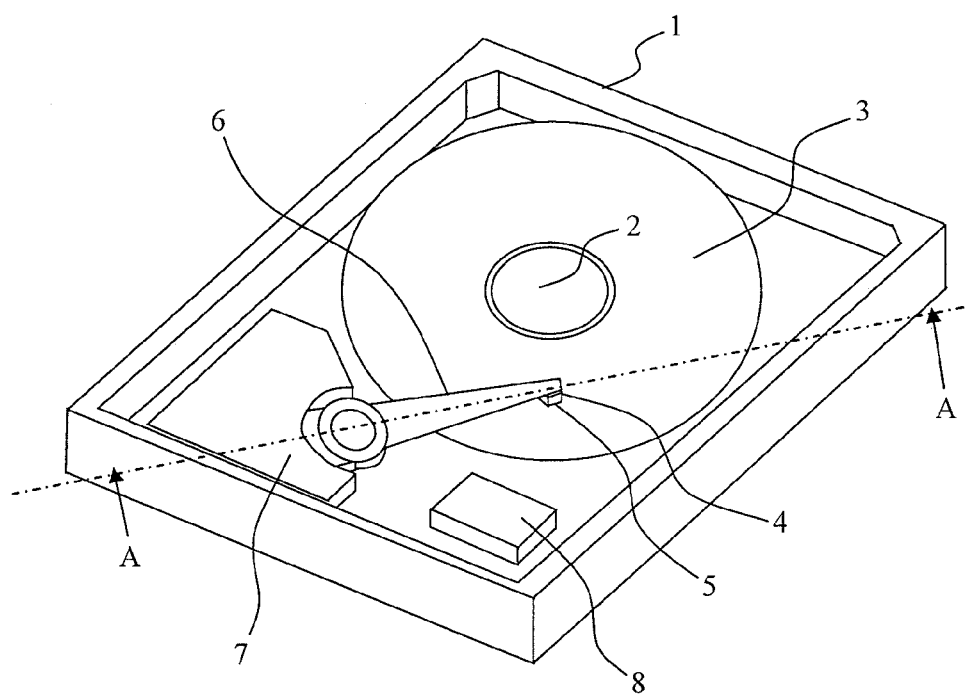
FIG. 3 is a schematic diagram of main parts showing an example of a magnetic recording system of the present invention.
Figure 4:
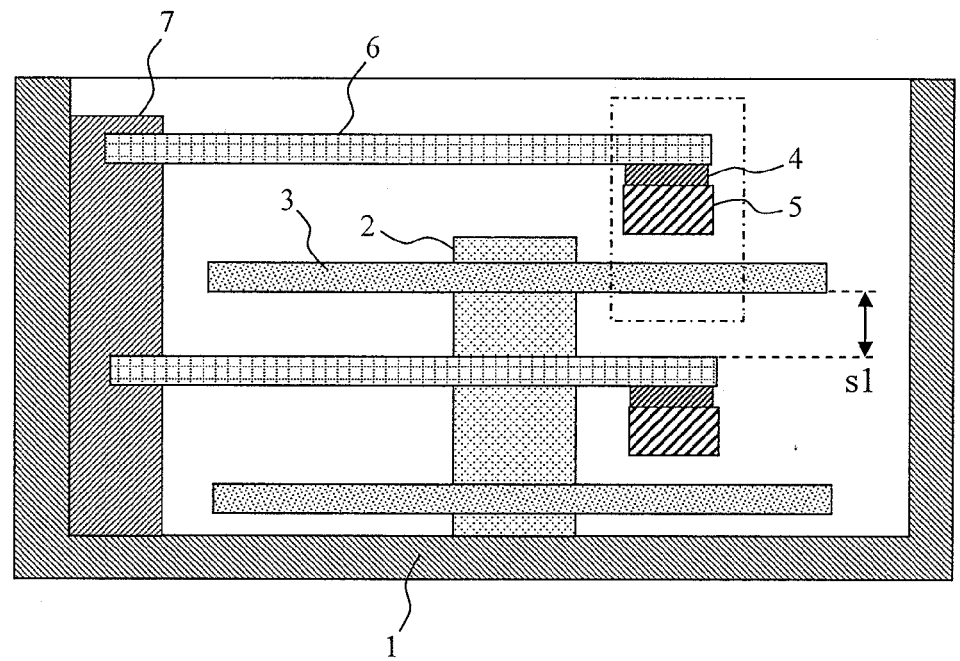
FIG. 4 is an A-A cross-sectional view of FIG. 3.

An embodiment of an information recording apparatus including a highly efficient optical integration mechanism of the present invention will be described with reference to FIGS. 1, 3, and 4. FIG. 3 is a schematic diagram of main parts of a magnetic recording system as the embodiment, and FIG. 3 shows a state in which an upper lid of a housing 1 is removed. FIG. 4 is an A-A cross-sectional view of FIG. 3. FIG. 1 is a diagram shown by enlarging an area shown by alternate long and short dash lines in FIG. 4 to describe the surrounding of a magnetic head in detail.

As shown in FIG. 3, a magnetic head 5 is fixed at a tip of a suspension 6, and a voice coil motor 7 positions the magnetic head 5 over a magnetic recording medium. A magnetic recording medium 3 rotates by being fixed to a spindle 2 driven by a motor. As shown in FIG. 1, an air bearing surface (ABS) is formed on a magnetic head bottom surface 17. As a result, a negative pressure is generated between the magnetic recording medium 3 and the magnetic head bottom surface 17 during rotation of the magnetic recording medium 3, and the magnetic head files by an amount of 10 nm or less over the magnetic recording medium 3.

As shown in FIG. 4, at least one magnetic recording medium 3 fixed to the spindle 2 and at least one suspension 6 fixed to the voice coil motor 7 are included in the housing 1. A distance s1 between the suspension 6 and the magnetic recording medium 3 above is 1 mm or less. A light source 4 that emits light necessary for thermal-assisted magnetic recording and the magnetic head 5 are mounted on each suspension 6. The light source 4 is arranged between the suspension 6 and the magnetic head 5. The arrangement of the light source 4 allows releasing the heat generated by the light source 4 to the side of the magnetic recording medium 3 through the magnetic head 5 during flying of the magnetic head 5, and stable drive of the light source is possible.

As shown in the cross-sectional view around the magnetic head of FIG. 1, a spot size converter 13 that can propagate light while reducing the spot size is formed inside the magnetic head. A length L1 of the magnetic head is 230 μm in accordance with the size of the slider. A laser diode 10 that is mounted on a sub-mount 11 and that generates light at wavelength 760±20 nm in a single mode is used as the light source 4. One end face of the laser diode 10 is processed to set an angle θ₁ relative to a vertical plane to 40 to 45 degrees to reflex the light in the direction of the magnetic head bottom surface. A light transmission hole 12 is created on the sub-mount 11 to allow the light to enter the spot size converter 13 made of a light coupling unit 14 and a high-refractive-index core 15.

The light transmission hole 12 can be filled by a material with less light absorption and higher refractive index than air (refractive index>1). This can prevent the enlargement of the spot size of the light emitted from the laser diode 10. A UV curable resin, a thermosetting adhesive, etc. that are generally used to bond optical components can be used as the material filling the light transmission hole 12. This is because the material can not only prevent the enlargement of the spot size, but also function as an adhesive for bonding the sub-mount 11 and the magnetic head.

Light emitted from the light source (incident light 9) propagates inside the spot size converter 13. The light is led to the magnetic head bottom surface 17 while the spot size is reduced, and the light is directed to the magnetic recording medium 3. A near-field-light generator 18 that can generate a minute light spot may be formed at a terminal portion of the spot size converter 13. A metal scatterer that is triangular in shape as seen from the magnetic head bottom surface 17 can be used as the near-field-light generator 18. A light-shielding film may be formed around the near-field-light generator 18 to prevent background light existing around the near-field-light generator 18 from being directed to the magnetic recording medium 3. The near-field-light generator 18 may have a V-shaped opening or a C-shaped opening in which part of the metal scatterer is connected to the light-shielding film. In other words, the near-field-light generator 18 may be a metal film having a V-shaped opening or a C-shaped opening.

A thin film coil 19 formed inside the magnetic head is used to generate a magnetic field necessary for recording, and a magnetic main pole 20 leads the generated magnetic field to a terminal portion of the spot size converter. The distance between the magnetic main pole 20 and the high-refractive-index core 15 is 200 nm or less. A magnetic return pole 21 for framing a closed magnetic path is formed on the opposite side of the thin film coil 19. A magnetic reproducing element (Giant Magneto Resistive (GMR) element or Tunneling Magneto Resistive (TMR) element) 22 that reproduces a recording mark is formed next to the magnetic return pole 21. A shield 23 for shielding a magnetic field of the surrounding is formed around the magnetic reproducing element 22.

A recording/reproducing method using the information recording apparatus will be described. While the magnetic recording medium 3 is rotating, the thin film coil 19 arranged in the magnetic head 5 generates a magnetic field at the moment of recording, and the laser diode 10 emits light to form a magnetic recording mark on the magnetic recording medium 3. The light propagated through the spot size converter 13 is directed to the magnetic recording medium 3 at the moment of the emission of the laser diode 10 to heat the medium, and thermal-assisted magnetic recording is realized. However, coercive force of the medium is essentially determined by the temperature of the magnetic recording medium in the thermal-assisted magnetic recording. Therefore, the timing of the generation of the magnetic field and the timing of the emission of the light source 4 do not have to be the same. For example, the magnetic field may be generated after the emission of the light source 4 and heating of the magnetic recording medium 3. The light can be continuously emitted to the magnetic recording medium, and a magnetic field, in which information to be recorded is modulated to a magnetic field pulse, can be applied to record the magnetic information in the magnetic recording medium. Furthermore, the magnetic field can be continuously applied, and light, in which information to be recorded is modulated to an optical pulse, can be emitted to record the magnetic information in the magnetic recording medium. The magnetic reproducing element 22 formed on the magnetic head shown in FIG. 1 is used to reproduce the magnetic recording mark. A signal processing LSI 8 shown in FIG. 3 processes the reproduction signal.

Figure 23:
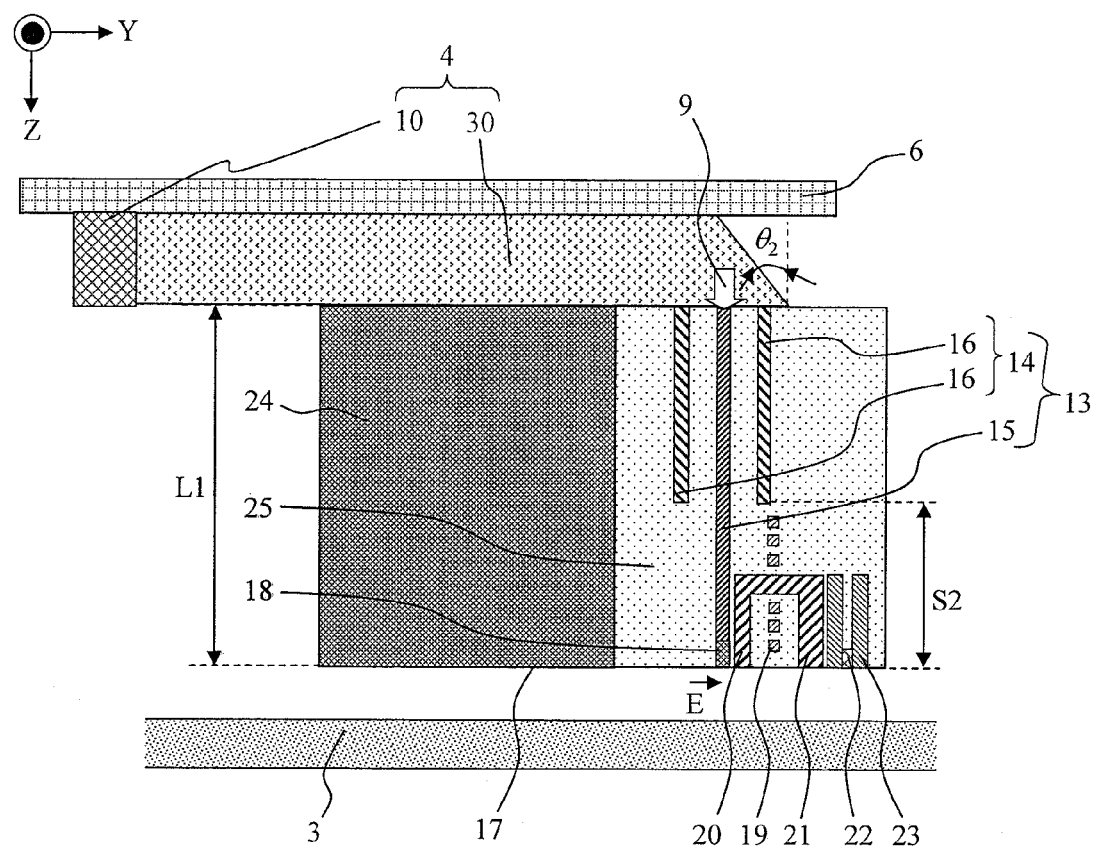
FIG. 23 is a cross-sectional side view near the magnetic head including the spot size converter of the present invention and is a diagram showing an example in which a laser diode and a waveguide are used for the light source.
Figure 24:
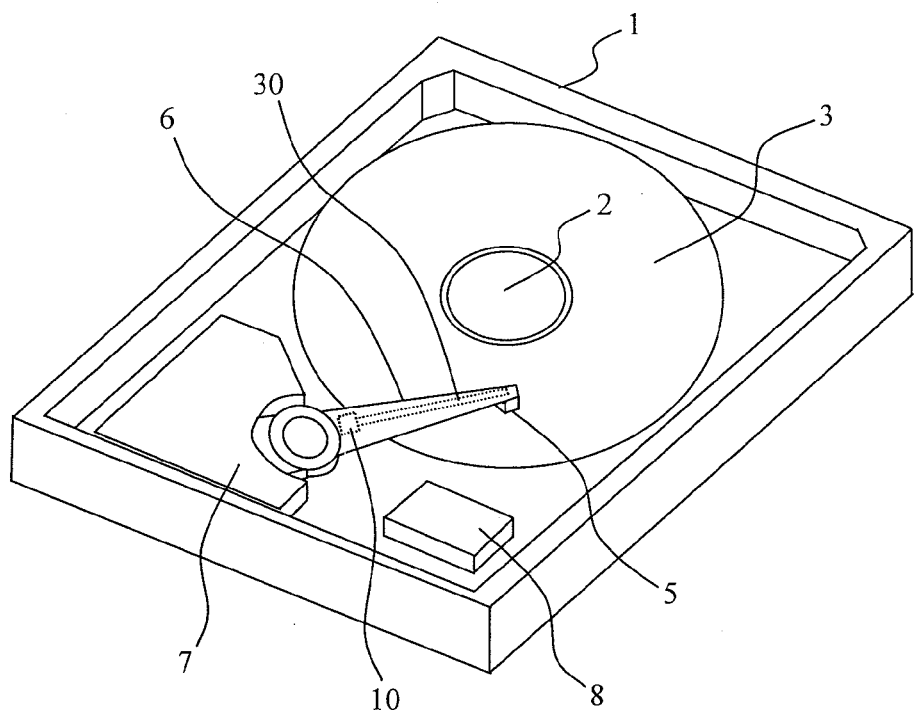
FIG. 24 is a schematic diagram of main parts showing an example of the magnetic recording system of the present invention and is a diagram showing an example in which the laser diode is placed at the root of a suspension.

In the embodiment, a combination of the laser diode 10 and the sub-mount 11 is used for the light source 4. However, as shown in FIGS. 23 and 24, the light emitted from the laser diode 10 placed at the root of the suspension 6 may be used by leading the light to the magnetic head 5 by a waveguide 30 of the single mode. One end face of the waveguide 30 is processed to set an angle θ₂ to 40 to 45 degrees to reflex the light in the direction of the magnetic head bottom surface to allow the light to enter the spot size converter 13. The waveguide 30 and the magnetic head are bonded by an adhesive, such as a UV curable resin and a thermosetting adhesive. According to the light source, the end face of the laser diode does not have to be processed as the laser diode of FIG. 1. Therefore, an inexpensive laser diode with better versatility can be used.

The spot size converter formed in the magnetic head will be described in detail with reference to FIGS. 1 and 5 to 17. The spot size converter 13 constituted by the light coupling unit 14 including a plurality of thin-film-like cores 16 with thin core thickness and the high-refractive-index core 15 made of a material with higher refractive index than the thin-film-like cores 16 and having submicron order sized width and thickness is formed inside the magnetic head. The thin-film-like cores 16 and the high-refractive-index core 15 are covered by a clad material 25 with lower refractive index than the cores. The light coupling unit 14 is configured to directly couple with the light (incident light 9) emitted from the light source 4 to propagate the light to the high-refractive-index core 15. Therefore, the light coupling unit 14 extends from the magnetic head upper surface to the direction of the magnetic head bottom surface 17. The high-refractive-index core 15 is configured to direct light to the magnetic recording medium. Therefore, the high-refractive-index core 15 extends from the magnetic head bottom surface 17 to the direction of the upper surface.

The magnetic head bottom surface 17 denotes a surface on which ABS of the magnetic head is formed. The thin-film-like core 16 of the light coupling unit denotes a core with a width or a thickness thinner than a thickness Tt that may set a mode in which the light propagating along the core significantly exudes from the core. The thickness Tt is approximately expressed by the following formula by transforming a standing wave conditional formula of zero-dimensional mode in the optical waveguide.

$$Tt = \frac{\pi}{2\pi \cdot n_1 \cdot \sin\phi / \lambda}$$

$$\phi = \sin^{-1}\left(\frac{\sqrt{n_1^2 - n_2^2}}{n_1}\right)$$

λ: wavelength of light in vacuum
$n_1$: refractive index of core material
$n_2$: refractive index of clad material In the formula, φ denotes a critical angle of light in a clad interface.

Figure 5:
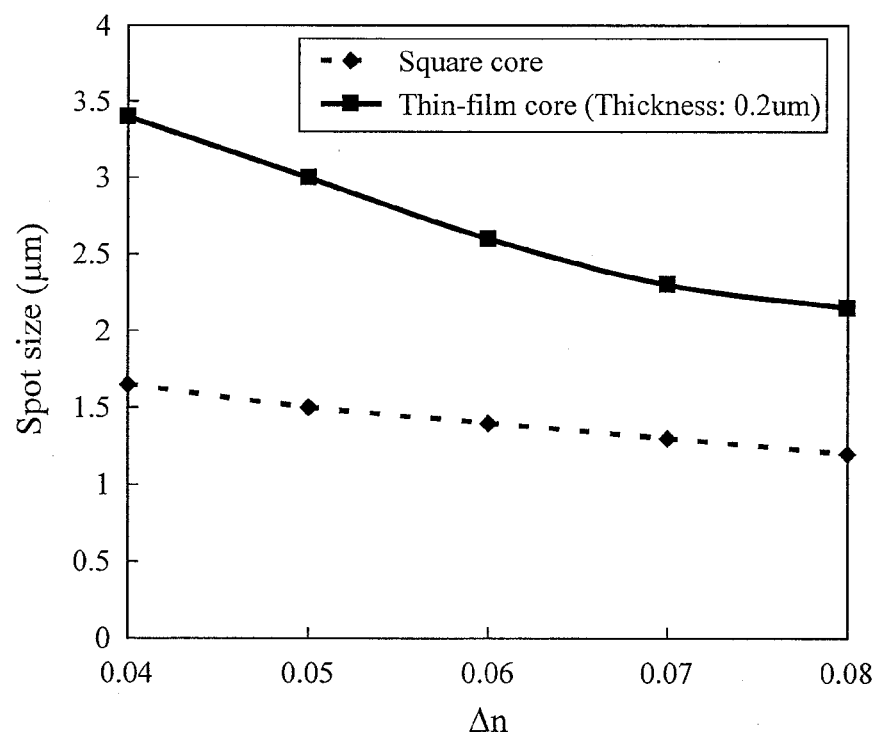
FIG. 5 is a diagram showing a relationship between Δn of a square shaped core and a thin-film-like core and the spot size of light that can be propagated in a single mode.

Compared to a general square shaped core, the thin-film-like core is advantageous in that coupling and propagation of light with a large spot size is possible in a single mode even with high Δn. FIG. 5 shows a result of calculation of Δn dependency of spot size of light that can be stably coupled and propagated in the single mode by the square shaped core and the thin-film-like core (0.2 μm thickness). It can be recognized from FIG. 5 that the thin-film-like core can couple and propagate light of larger spot size in the single mode even with high Δn. The reason that the thin-film-like core can propagate the light with a large spot size even though the core is thin is that a mode for propagating the light with a light power profile of significantly exuding to the side of the clad is set when the core thickness is smaller than Tt.

The core length (length in a Z-axis direction) of the thin-film-like core 16 of the light coupling unit does not reach the magnetic head bottom surface 17. As a result, direct irradiation of excessive light propagated through the thin-film-like core on the magnetic recording medium can be prevented.

In the present embodiment, the clad material 25 is made of $Al_2O_3$, the core material of the thin-film-like core 16 of the light coupling unit 14 is made of $Al_2O_3$—$Si_3N_4$ or $Al_2O_3$—$Ta_2O_5$ with refractive index 1.74 or 1.70, and the core material of the high-refractive-index core 15 is made of $Ta_2O_5$ with refractive index 2.13. For $Al_2O_3$—$Si_3N_4$ as the core material of the thin-film-like core 16, $Al_2O_3$ and $Si_3N_4$ are sputtered at the same time by a sputtering method, and at this point, the film forming rate of $Al_2O_3$ and the film forming rate of $Si_3N_4$ are controlled to adjust the refractive index of $Al_2O_3$—$Si_3N_4$. Similarly, for $Al_2O_3$—$Ta_2O_5$, $Al_2O_3$ and $Ta_2O_5$ are sputtered at the same time, and the film forming rate of $Al_2O_3$ and the film forming rate of $Ta_2O_5$ are controlled to adjust the refractive index. Even if other core material and clad material are used, the characteristics of the optical waveguide (the spot size converter is also a type of the optical waveguide) scarcely change if the refractive index difference Δn of the core material and the clad material is the same. Therefore, for example, $SiO_xN_y$ (refractive index 1.53 or 1.49) can be used for the core material of the thin-film-like core 16, and $SiO_2$ (refractive index 1.45) can be used for the clad material 25.

Figure 6A:
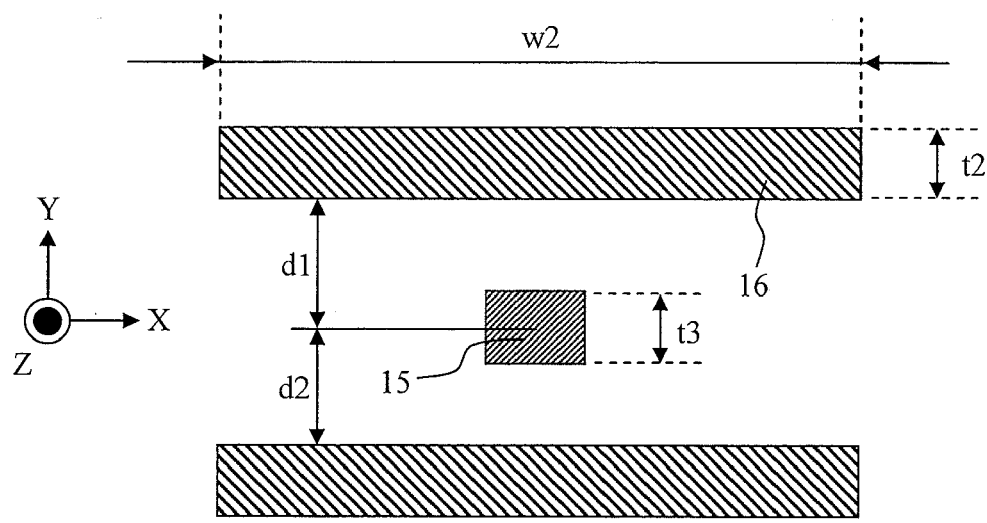
FIGS. 6A and 6B are cross-sectional views of the spot size converter including two thin-film-like cores of the present invention, FIG. 6A being a diagram showing an example in which two thin-film-like cores are substantially flat, FIG. 6B being a diagram showing an example in which one thin-film-like core is not flat.
Figure 6B:
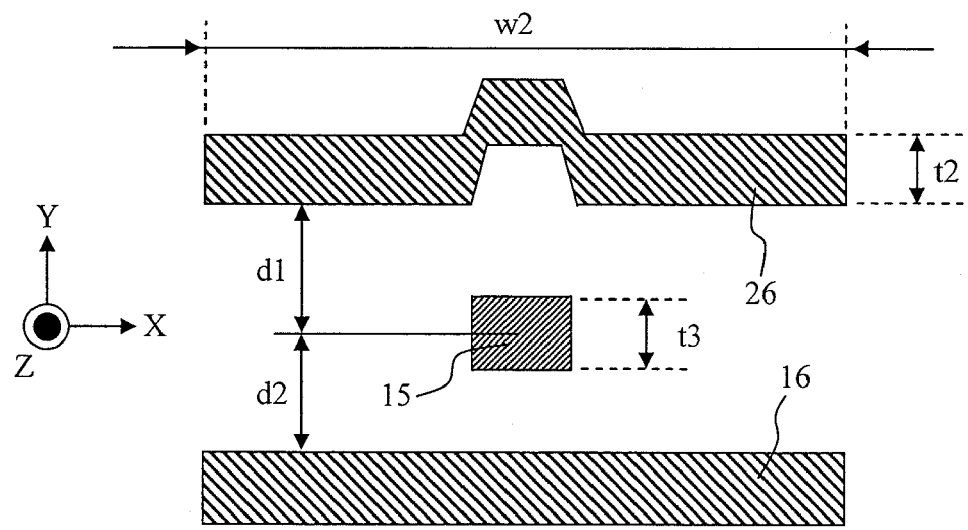
Figure 7A:
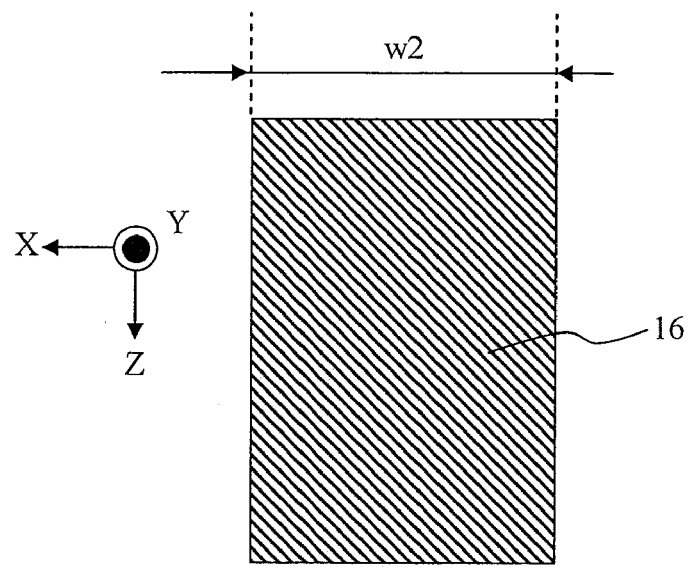
FIGS. 7A and 7B are diagrams showing cross-sectional side views of the thin-film-like cores used in the spot size converter of the present invention, FIG. 7A being a diagram showing an example in which the shape of the thin-film-like core is substantially rectangular, FIG. 7B being a diagram showing an example in which the core width of the thin-film-like core is wider toward the magnetic head bottom surface.
Figure 7B:
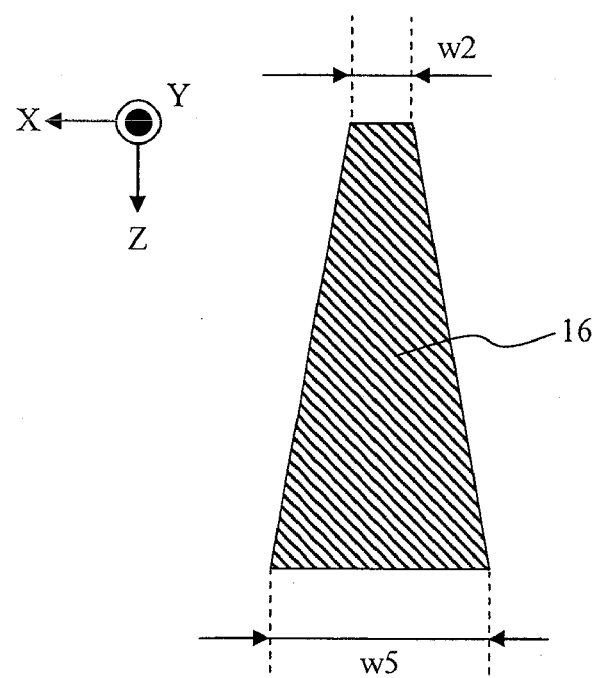

In the present embodiment, the light coupling unit 14 including two thin-film-like cores 16 is used. FIGS. 6A and 6B are C-C cross-sectional views of FIG. 1, and FIGS. 7A and 7B are D-D cross-sectional views of FIG. 1. As shown in FIGS. 6A and 7A, an XY plane and an XZ plane of two thin-film-like cores 16 of the light coupling unit 14 are both rectangular, and the sizes are substantially the same. The cores are substantially parallel to each other as shown in FIGS. 1 and 6A, and a width w2 and a thickness t2 of the cores are adjusted so that the thin-film-like cores 16 become single mode waveguides. In this way, the interference of the lights in the optical waveguide can be prevented by setting the thin-film-like cores 16 as the signal mode waveguides. As a result, a change in the power of the light emitted from the spot size converter 13 can be prevented.

Figure 8:
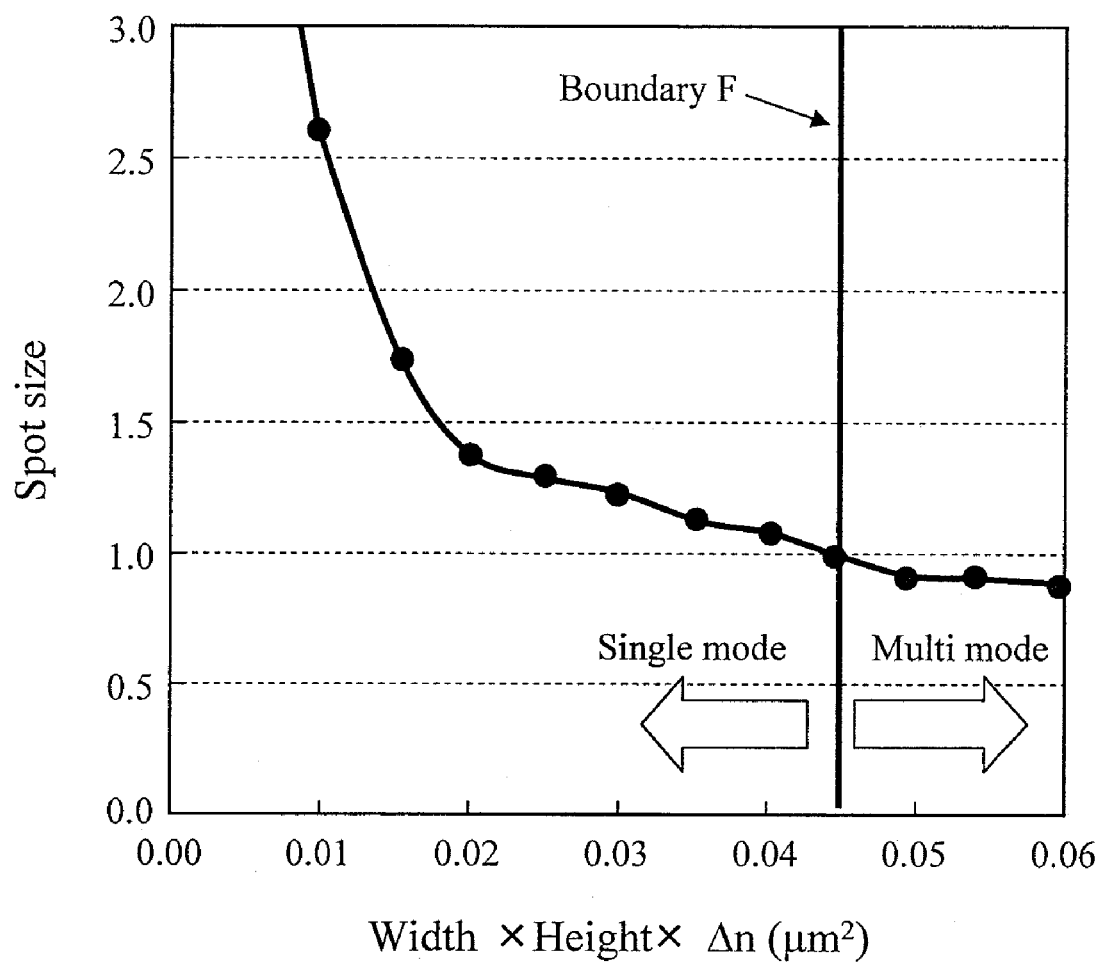
FIG. 8 is a diagram showing a relationship between the spot size of light that can be coupled and propagated by the thin-film-like cores and the value of core width×core thickness×Δn.

FIG. 8 shows a condition for the thin-film-like core 16 to become the single mode waveguide and a result of calculation of the spot size of light propagating the optical waveguide by use of a BPM (Beam Propagation Method). A horizontal axis of FIG. 8 shows values of width×thickness×Δn of the thin-film-like core (Δn=refractive index of core material of thin-film-like core–refractive index of clad material), and a vertical axis shows the spot size. The left side of a boundary F in FIG. 8 denotes an area where the single mode waveguide is set, and the right side denotes an area where the multi mode waveguide is set. The spot size of the vertical axis is standardized by a spot size when width×thickness×Δn=0.045. It can be recognized from FIG. 8 that the single mode waveguide is set when width×thickness×Δn=0.045 or less. It can also be recognized that the spot size is rapidly enlarged when the value of width×thickness×Δn is 0.015 or less. This means that the tolerance for the core manufacturing error is small. Therefore, the thin-film-like core can be adjusted so that the value of width×thickness×Δn is 0.015 to 0.045 $μm^2$. In the present embodiment, the width w2 of the thin-film-like cores 16 is 2 μm or 4 μm, and the thickness t2 is 0.20 μm or 0.25 μm. As for the length of the thin-film-like cores 16 (Z axis direction is set as the length of layer), the thin-film-like cores 16 are set from the magnetic head upper surface so that a distance S2 from the magnetic head bottom surface is 30 μm as shown in FIG. 1 to prevent excessive light propagated through the thin-film-like cores from being directed to the magnetic recording medium.

Figure 9A:
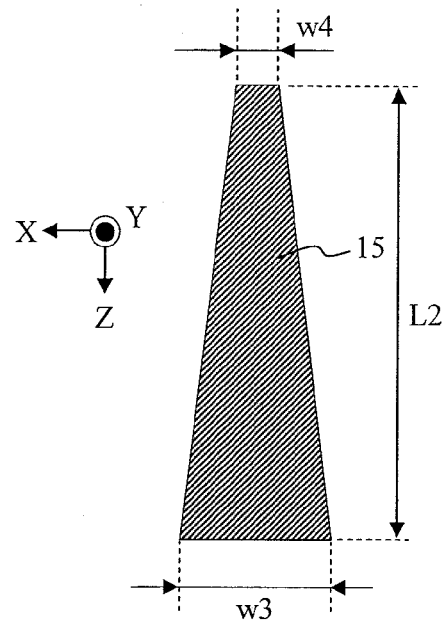
FIGS. 9A and 9B are diagrams showing cross-sectional side views of a high-refractive-index core used in the spot size converter of the present invention, FIG. 9A being a diagram showing an example in which the shape of a tapered portion is linearly thinner toward a tip, FIG. 9B being a diagram showing an example in which the shape of the tapered portion is quadratically thinner toward the tip.

In the present embodiment, a taper-shaped core is used for the high-refractive-index core 15. As shown in FIGS. 1 and 6, the high-refractive-index core 15 and the thin-film-like cores 16 are substantially parallel, and a tapered portion of the high-refractive-index core 15 is arranged at the center between two thin-film-like cores. The arrangement of the high-refractive-index core 15 allows coupling the light propagated through the thin-film-like cores with the high-refractive-index core 15. Therefore, higher total optical propagation efficiency than when one thin-film-like core is used can be attained. The high-refractive-index core 15 has a taper shape as in FIG. 9A as seen on the XZ plane. FIG. 9A is an E-E cross-sectional view of FIG. 1.

Figure 10:
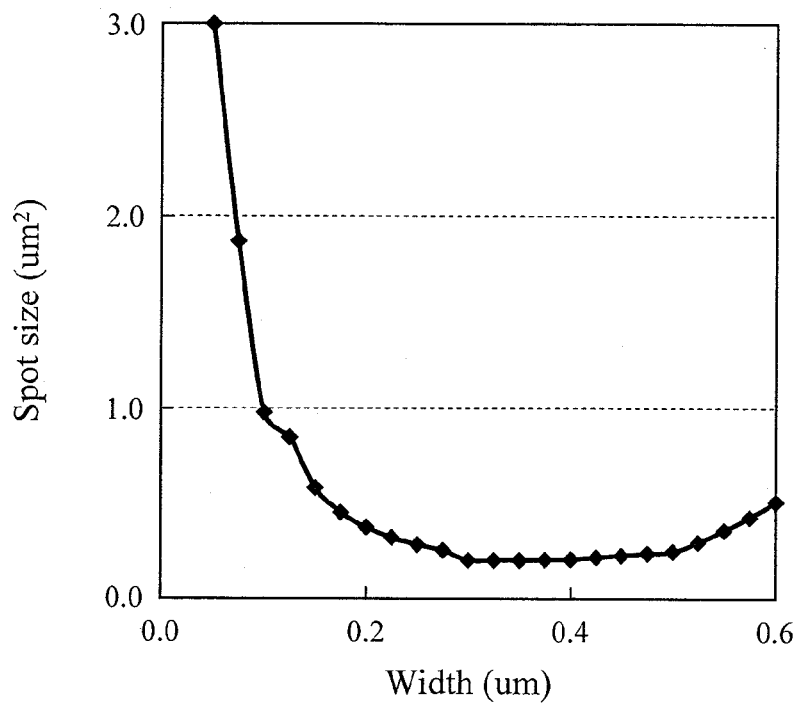
FIG. 10 is a diagram showing a relationship between the spot size of light propagating through an optical waveguide including the high-refractive-index core and the core width.

As described, the high-refractive-index core is configured to direct the light of a minute spot size to the magnetic recording medium. Therefore, a width w3 and a thickness t3 of the high-refractive-index core at the magnetic head bottom surface portion are adjusted to minimize the light spot size (sectional area of the spot here) emitted from the high-refractive-index core. FIG. 10 shows a result of calculation of core width dependency of the light spot size propagated when $Ta_2O_5$ with thickness 0.3 μm is used for the core material. As shown in FIG. 10, the spot size can be minimized at core width 0.3 to 0.5 μm. Therefore, in the present embodiment, the width w2 of the high-refractive-index core is set to 0.3 μm, 0.4 μm, or 0.5 μm, and the thickness t3 is set to 0.3 μm, 0.4 μm, or 0.5 μm. When the near-field-light generator 18 is formed at the terminal portion of the high-refractive-index core 15, the width w3 and the thickness t3 of the high-refractive-index core 15 at the magnetic head bottom surface portion need to correspond with the size (width and thickness are both 0.5 μm or less) of the near-field-light generator 18. Therefore, it is preferable that the width w3 and the thickness t3 be 0.5 μm or less.

The shape of the high-refractive-index core 15 shown in FIG. 9A is adjusted so that the high-refractive-index core 15 highly efficiently couples with the light propagated through the light coupling unit 14 to reduce the spot size with low light loss. The high-refractive-index core 15 has a taper shape (trapezoid) in which the width of the core narrows down toward the light incident side. As described, in the taper-shaped core, the spot size of the light with large spot size coupled to the tip portion of the taper is reduced as the light propagates the tapered portion of the high-refractive-index core. In the present embodiment, a tapered tip width w4 and a length L2 of the tapered portion shown in FIG. 9A are adjusted to improve the total optical propagation efficiency.

Figure 9B:
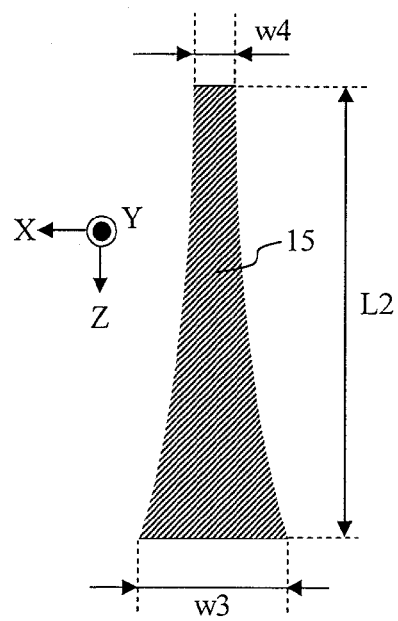
Figure 11:
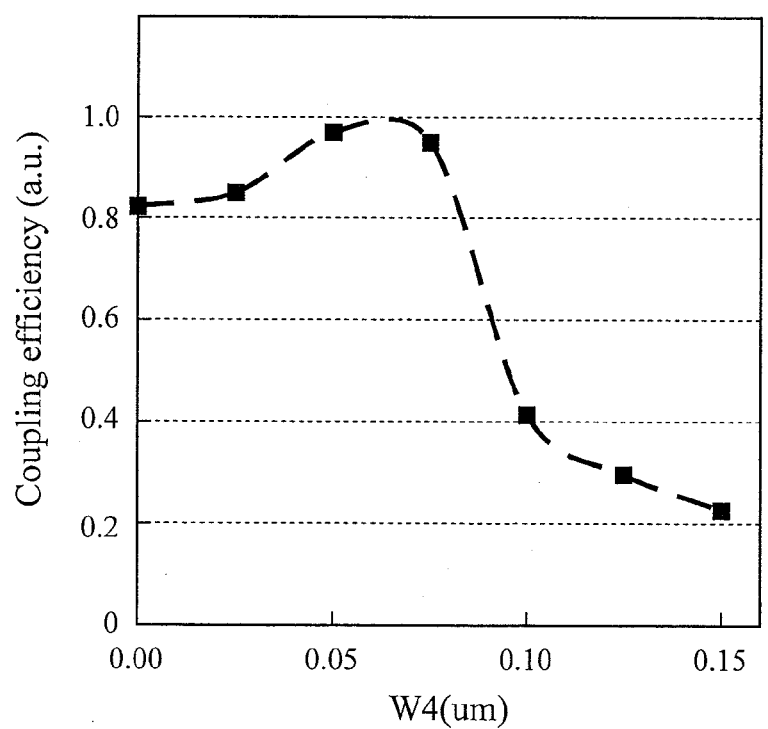
FIG. 11 is a diagram showing a relationship between the coupling efficiency of a high-refractive-index core portion of the present invention and the high-refractive-index core tip width.
Figure 12:
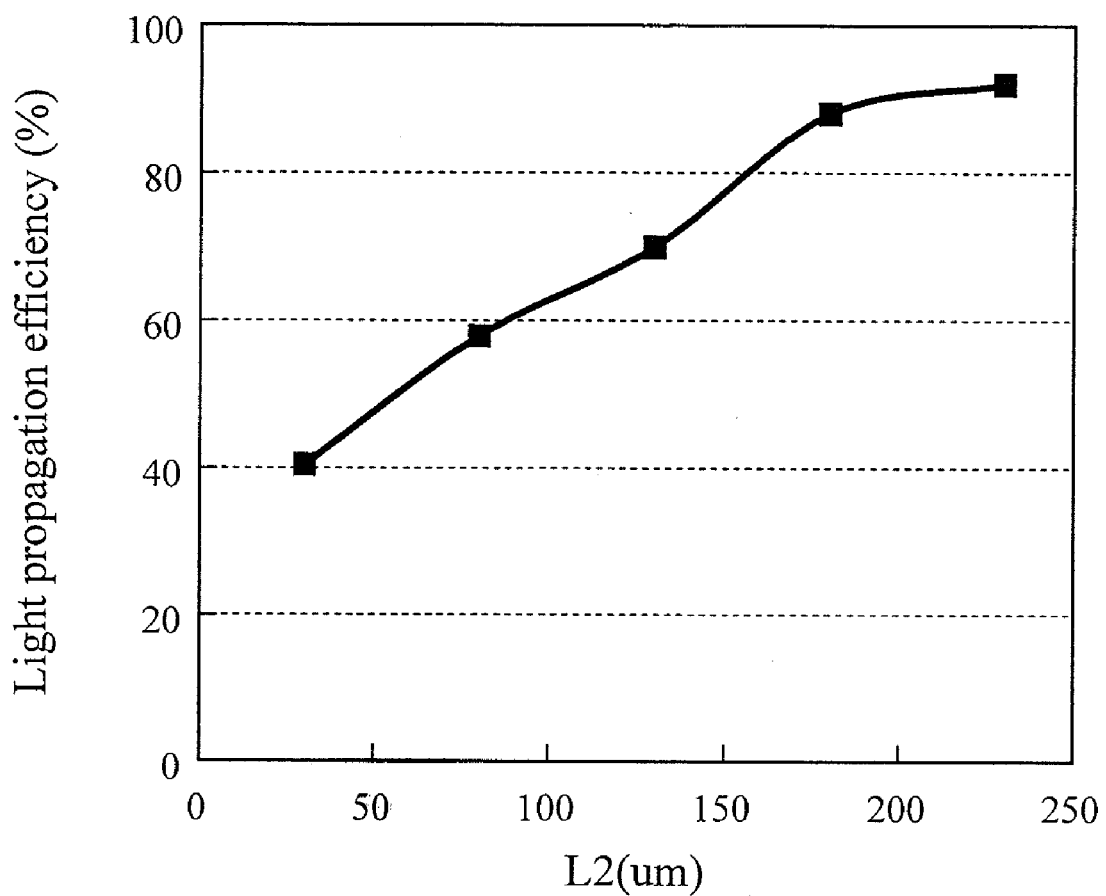
FIG. 12 is a diagram showing a relationship between the light propagation efficiency of a high-refractive-index core tapered portion of the present invention and the length of the high-refractive-index core tapered portion.

FIG. 11 shows a result of calculation of tapered tip width w4 dependency of the coupling efficiency of the light propagated through the light coupling unit 14 and the high-refractive-index core 15. As shown in FIG. 11, it can be recognized that the coupling efficiency is maximum when the tip width w4 is 0.05 to 0.075 μm. Therefore, the tip width w4 is set to 0.05 μm or 0.075 μm in the present embodiment. FIG. 12 shows a result of calculation of length L2 dependency of the light propagation efficiency of the tapered high-refractive-index core 15 when w4 is 0.05 µm. The maximum value of the length L2 is 230 µm in accordance with the length L1 of the magnetic head. As shown in FIG. 12, it can be recognized that the longer the length L2 is, the better is the propagation efficiency. Therefore, in the present embodiment, the length L2 of the tapered portion is 200 µm or more and 230 µm or less. As shown in FIG. 23, if L2 is 230 µm, one end of the high-refractive-index core 15 reaches the magnetic head upper surface. The shape of the tapered portion is not limited to trapezoid, and the tapered portion may have a shape as shown in FIG. 9B in which the width quadratically narrows down toward the tip portion. The high-refractive-index core 15 can attain similar advantages even if the thickness of the core in a Y-axis direction have a taper shape thinner toward the light incident side as in FIGS. 9A and 9B.

To maximize the total optical propagation efficiency of the spot size converter 13, intervals d1 and d2 between the thin-film-like cores 16 and the high-refractive-index core 15 shown in FIG. 6A also need to be adjusted in the light coupling unit 14. In the present embodiment, d1 and d2 are equal because the high-refractive-index core is formed at the center between the two thin-film-like cores 16.

Figure 13A:
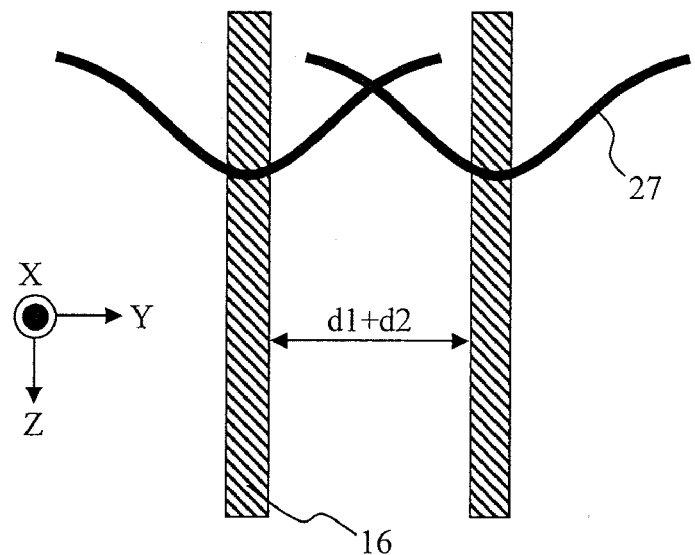
FIGS. 13A and 13B are conceptual diagrams for explaining the power profile of light propagating through a light coupling unit of the present invention, FIG. 13A being a diagram showing a case in which the distance between the thin-film-like cores is long, FIG. 13B being a diagram showing a case in which the distance between the thin-film-like cores is short.
Figure 13B:
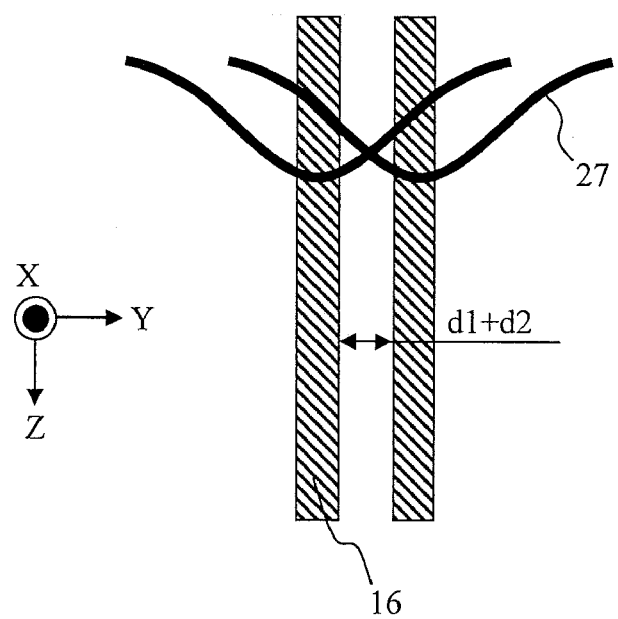

The principle will be simply described with reference to FIGS. 13 and 14. FIGS. 13A and 13B are cross-sectional views of the light coupling unit as seen from a YZ plane and are schematic diagrams explaining the power profile (light spot) of the light propagating the light coupling unit 14 including two thin-film-like cores 16 having the same shapes. When light enters the light coupling unit 14, light spots 27 shown in FIGS. 13A and 13B propagate along the thin-film-like cores 16. As shown in FIG. 13B, if the interval d1+d2 between the cores is short, the light spots 27 overlap, and a power distribution that is substantially the same as that of one light spot is obtained. Therefore, the coupling efficiency with the incident light of the light coupling unit is substantially the same as that of one thin-film-like core. However, if the interval d1+d2 is large as shown in FIG. 13A and the distance between the cores is long enough, it is equivalent to the propagation of light to two thin-film-like cores. Therefore, the coupling efficiency is about twice as much as when the interval d1+d2 is small.

Figure 14A:
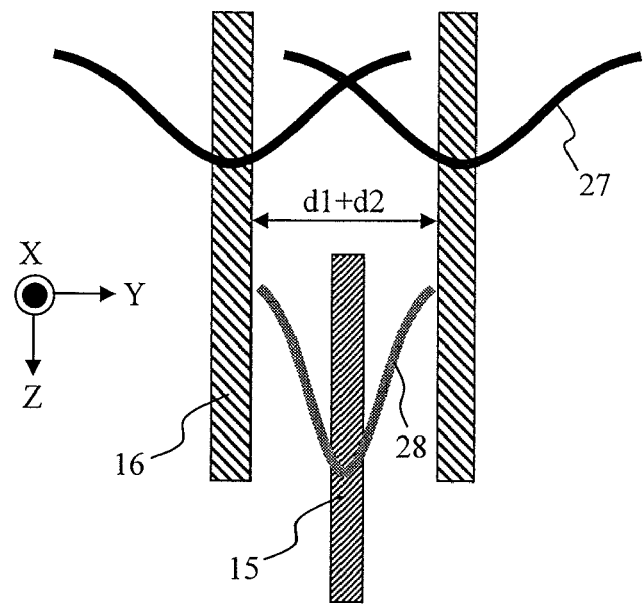
FIGS. 14A and 14B are conceptual diagrams for explaining light coupling between the light coupling unit and the high-refractive-index core based on the power profiles of light propagating through the light coupling unit and the high-refractive-index core of the present invention, FIG. 14A being a diagram showing a case in which the distance between the thin-film-like cores is long, FIG. 14B being a diagram showing a case in which the distance between the thin-film-like cores is short.
Figure 14B:
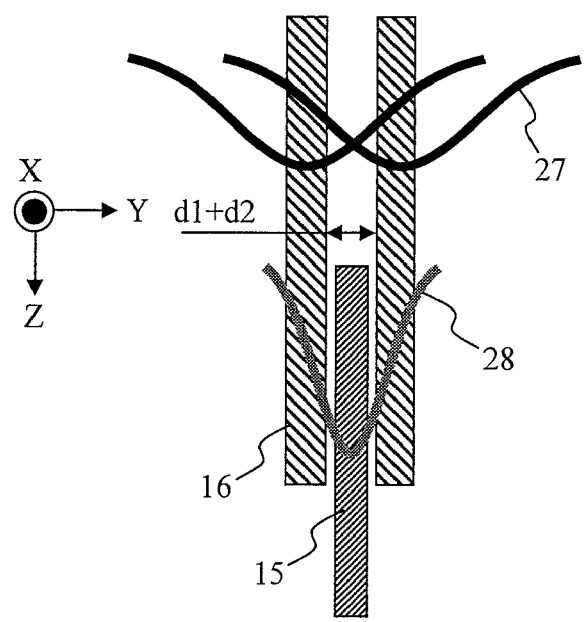

However, as the interval d1+d2 becomes larger, the coupling efficiency of the light propagated through the light coupling unit 14 and the high-refractive-index core 15 is reduced. This is because a mismatch between the power profiles of the light propagating through the light coupling unit and of the light propagating through the high-refractive-index core becomes large. FIGS. 14A and 14B are cross-sectional views of the spot size converter 13 as seen from the YZ plane and are diagrams schematically showing the power profile (light spot 28) of the light propagating through the light coupling unit 14 and the light propagating through the tip portion of the high-refractive-index core. If the interval d1+d2 between the cores is small as shown in FIG. 14B, the power profiles of the light 27 propagating through the light coupling unit and of the light 28 propagating through the tip portion of the high-refractive-index core are close. Therefore, the light highly efficiently couples with the high-refractive-index core. On the other hand, if the interval d1+d2 between the cores is large as shown in FIG. 14A, the coupling efficiency is reduced because the difference between the power profiles is large.

Figure 15:
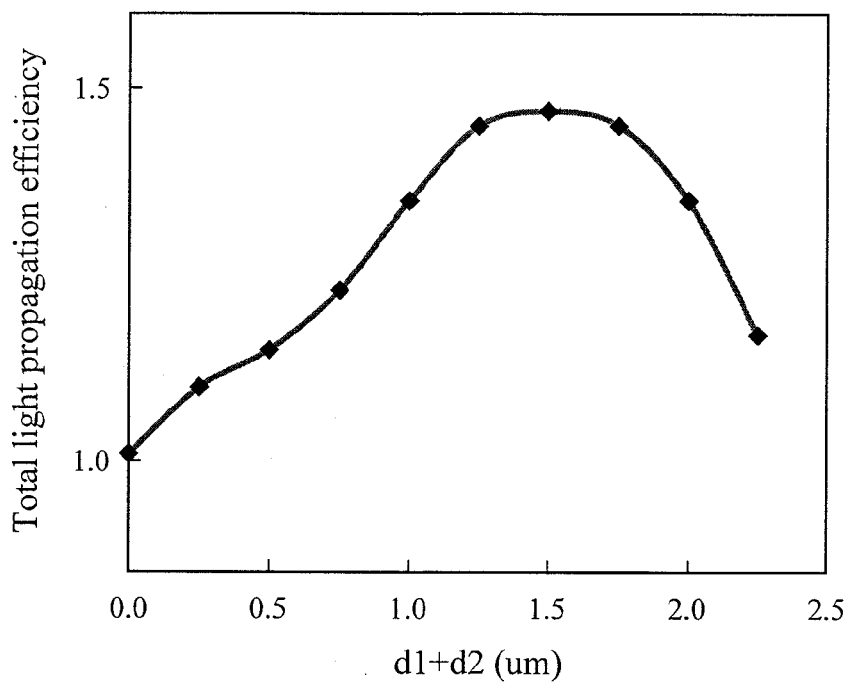
FIG. 15 is a diagram showing a relationship between the total optical propagation efficiency of the spot size converter including two thin-film-like cores of the present invention and the distance between the thin-film-like cores.

Therefore, to obtain the maximum total optical propagation efficiency, a BPM method is used to calculate the relationship between the total optical propagation efficiency of the spot size converter 13, which uses two thin-film-like cores 16 and the high-refractive-index core 15, and the interval d1+d2. FIG. 15 shows a calculation result, and as for the total optical propagation efficiency of the vertical axis, the use efficiency when there is only one thin-film-like core 16 is standardized as 1. The total optical propagation efficiency is more than 1.3 times that in the case of one thin-film-like core when the interval d1+d2 is about 1.2 to 1.8 µm. It can be recognized that the value of d1 (=d2) is about ±20% of a half of a half width of the spot size in the Y direction of the light propagating along the thin-film-like cores 16 just at a high-refractive-index core tip location Z1 (FIG. 1). Therefore, it is preferable that the interval between the thin-film-like cores 16 and the high-refractive-index core 15 is within a value of ±20% of a half of a half width of the spot size in the Y direction of the light propagating along the thin-film-like cores 16 at the tip location of the high-refractive-index core 15. Therefore, the interval d1+d2 is 1.5 µm or 1.7 µm in the present embodiment. The half width of the spot size in the Y direction of the light propagating around the thin-film-like cores can be obtained using the BPM method if the width, the thickness, and Δn of the thin-film-like cores are known.

The shape of the thin-film-like core 16 does not have to be flat at all parts on the XY plane, and similar advantages can be obtained even if part of the core is not flat. The case of a thin-film-like core 26 shown in FIG. 6B is an example. As shown in FIG. 6B, even if the thin-film-like core has a shape in which a part corresponding to the location of the high-refractive-index core 15 protrudes in the Y direction and which is partially not flat, similar advantages as an entirely flat thin-film-like core can be obtained.

Figure 16:
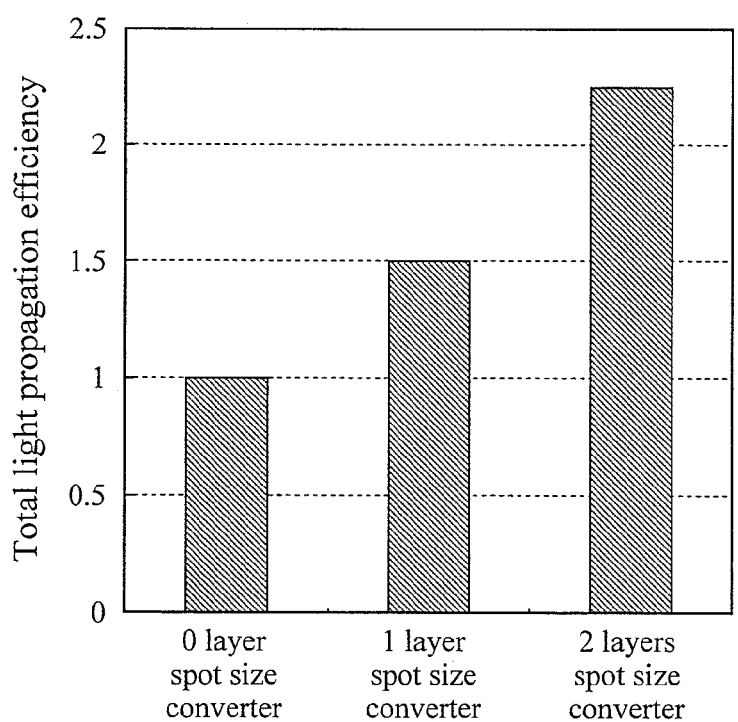
FIG. 16 is a diagram comparing the total optical propagation efficiency of the spot size converter including two thin-film-like cores of the present invention, the total optical propagation efficiency of the spot size converter including one thin-film-like core and the high-refractive-index core, and the total optical propagation efficiency of the spot size converter including only the high-refractive-index core.

FIG. 16 shows a result of calculation and comparison of total optical propagation efficiencies of the spot size converter 13 with a combination of the light coupling unit 14 including two-film-like cores 16 described above and the taper-shaped high-refractive-index core 15 (hereinafter, called "two-layer spot size converter"), a spot size converter with a combination of one thin-film-like core 16 and the taper-shaped high-refractive-index core 15 (hereinafter, called "one-layer spot size converter"), and a spot size converter including only the taper-shaped high-refractive-index core 15 (hereinafter, called "zero-layer spot size converter"). As shown in FIG. 16, as a result of the use of the two-layer spot size converter, the total optical propagation efficiency can be improved to about 1.5 times that of the one-layer spot size converter and about 2.25 times that of the zero-layer spot size converter.

In the embodiment, although the shape of the thin-film-like core 16 of the light coupling unit 14 is rectangular as seen from the XZ plane, the core width near the magnetic head bottom surface may be wider toward the magnetic head bottom surface as shown in FIG. 7B. The thin-film-like core can reduce the spot size by enlarging the width. Therefore, as the thin-film-like core 16 shown in FIG. 7B is used, the spot size of the light propagating through the core is reduced toward the magnetic head bottom surface. As a result, the light propagating through the thin-film-like cores approaches the spot size of the light propagating through the high-refractive-index core 15, and the light propagating through the light coupling unit 14 can be efficiently coupled with the high-refractive-index core 15. In the present embodiment, the width w2 is 1 µm, and w5 is 2.0 µm. Similar advantages can be obtained by thickening not only the core width of the thin-film-like core, but also the core thickness toward the magnetic head bottom surface.

According to the present embodiment, the light propagated through the thin-film-like cores can be efficiently coupled with the high-refractive-index core. However, not all light can be coupled with the high-refractive-index core. If there is a light that cannot be coupled with the high-refractive-index core among the lights propagated through the thin-film-like cores, the light propagates through the thin-film-like cores, reaches near the magnetic head bottom surface, and illuminates the magnetic recording medium. When a long-term use of the magnetic recording system is considered, the magnetization information recorded in the medium may be deleted, and the power density of the light needs to be reduced as much as possible.

Figure 17A:
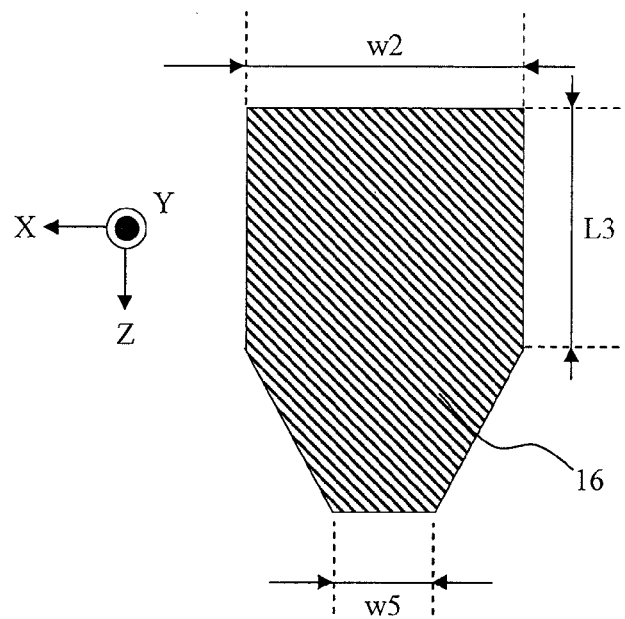
FIGS. 17A and 17B are diagrams showing cross-sectional side views of the thin-film-like core used in the spot size converter of the present invention, FIG. 17A being a diagram showing an example in which the core width of a terminal portion of the thin-film-like core is narrow, FIG. 17B being a diagram showing an example in which the core width of the thin-film-like core is wider toward the magnetic head bottom surface and narrower from the middle.
Figure 17B:
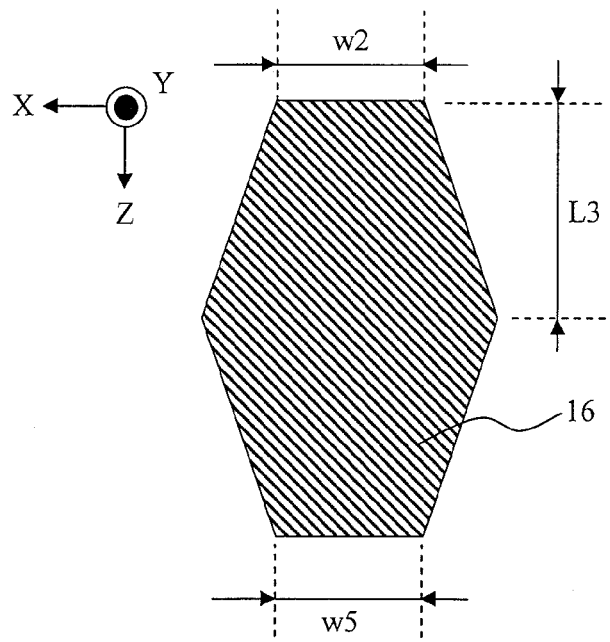

The reduction in the power density can be realized by narrowing down the width of the thin-film-like core 16 only at the part close to the magnetic head bottom surface as shown in FIGS. 17A and 17B. The spot size can be enlarged by narrowing down the width of the thin-film-like core. As a result, the power density can be reduced near the magnetic head bottom surface. FIG. 17A shows an example in which the width is narrowed down only at the part close to the magnetic head bottom surface. FIG. 17B shows an example in which the width is also narrowed down at the part close to the magnetic head bottom surface in the thin-film-like core shown in FIG. 7(B). In FIG. 17A, the core width w2 is 2 μm, w5 is 1 μm, and a core length L3 is 100 μm. In FIG. 17B, w2 and w5 are both 1 μm, and L3 is 100 μm. Similar advantages can be obtained by thinning not only the core width of the thin-film-like core, but also the core thickness toward the magnetic head bottom surface.

Although two thin-film-like cores of the light coupling unit 14 have the same shapes in the present embodiment, the widths, the thicknesses, and the refractive indices of the cores may be different. Even if the cores are different, the maximum total optical propagation efficiency can be realized by similarly adjusting the distances d1 and d2 between the thin-film-like cores and the high-refractive-index core.

Second Embodiment

A combination of a spot size converter, which is constituted by a light coupling unit including three or more thin-film-like cores and a high-refractive-index core, and the information recording apparatus of the present invention will be described.

Figure 18:
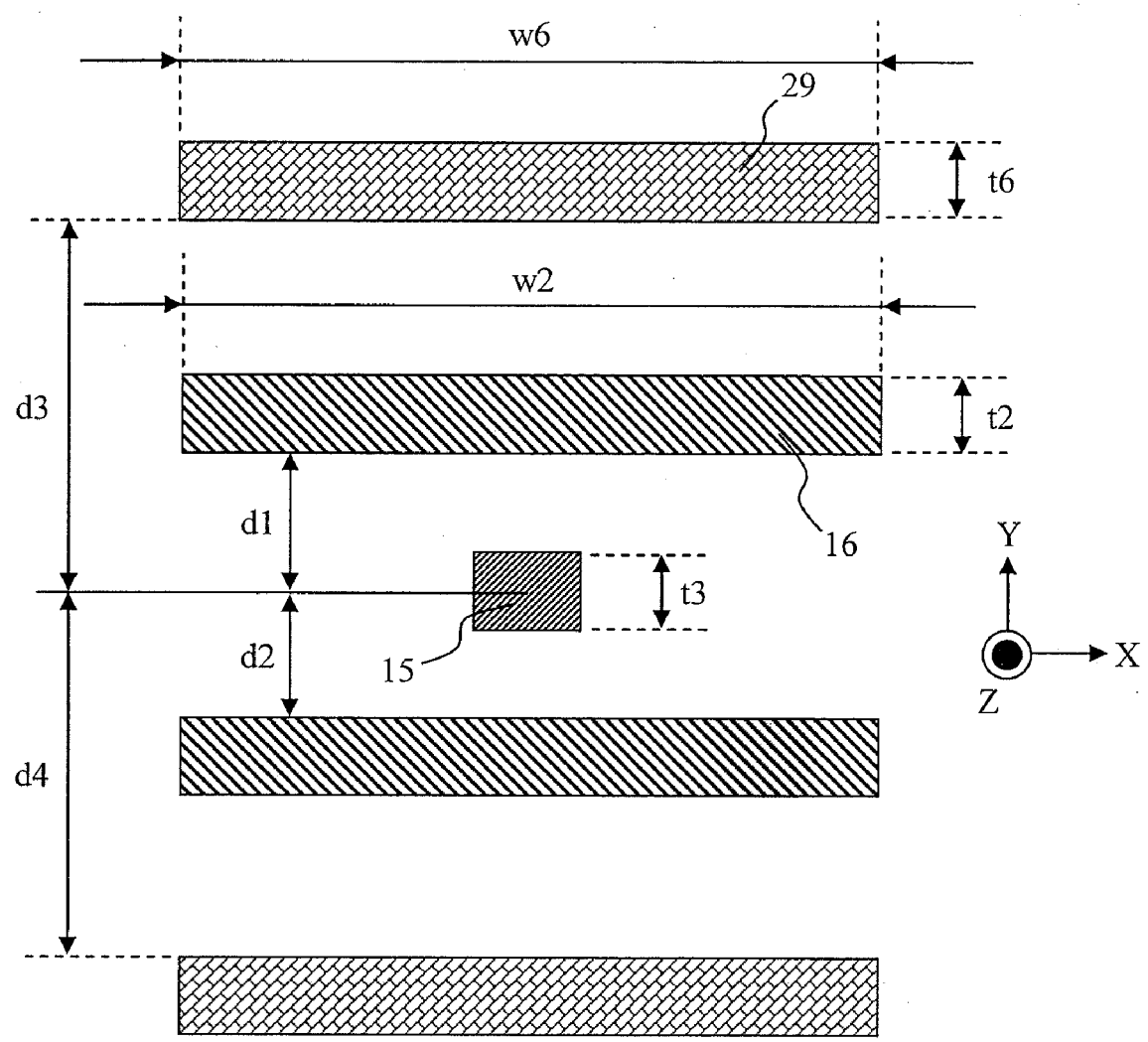
FIG. 18 is a cross-sectional view of the spot size converter including three or more thin-film-like cores of the present invention and is a diagram showing an example in which the refractive index is lower for the thin-film-like cores farther from the high-refractive-index core.

In the spot size converter of the first embodiment, two thin-film-like cores sandwich the high-refractive-index core as shown in FIGS. 1 and 6. As shown in FIG. 18, outer thin-film-like cores 29 can be further formed at locations distant outward in the ±Y directions relative to the inner thin-film-like cores 16 to further couple, with the high-refractive-index core 15, the light coupled and propagated to the thin-film-like cores at distant locations. Therefore, the spot size of the light can be converted by higher total optical propagation efficiency.

In the present embodiment, as shown in FIG. 18, two thin-film-like cores 29 that are substantially the same as the thin-film-like cores 16 are arranged substantially parallel with the high-refractive-index core 15 outside the two thin-film-like cores 16 of the spot size converter.

To couple the incident light with the two outer thin-film-like cores 29 and efficiently couple the propagated light with the high-refractive-index core 15, intervals d3 and d4 (d3=d4 in the present embodiment) between the cores need to be adjusted as in the first embodiment. As described, to obtain the maximum use efficiency, the interval (d3+d4 here) between the thin-film-like cores needs to be about ±20% of a half width of the spot size in the Y direction of the light propagating around the thin-film-like cores. Therefore, the spot size in the Y direction of the light propagating through the thin-film-like cores 29 needs to be designed to be larger than the inner thin-film-like cores 16. In the thin-film-like cores, the enlargement of the propagated spot size can be realized by reducing at least one of the width, the thickness, and Δn of the core as shown in FIG. 8. Therefore, at least one of the width, the thickness, and Δn of the outer thin-film-like cores 29 can be smaller than those of the inner thin-film-like cores 16.

Figure 19:
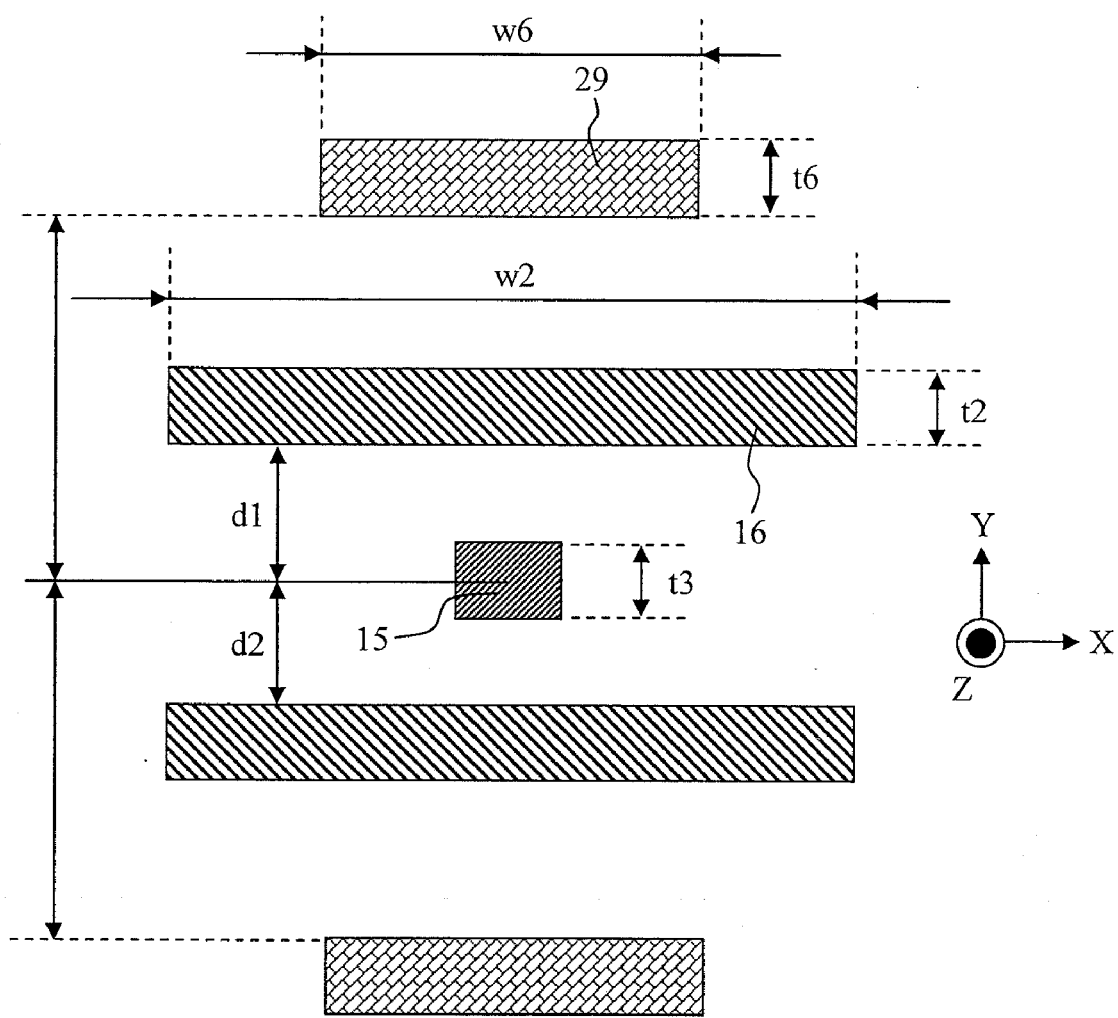
FIG. 19 is a cross-sectional view of the spot size converter including three or more thin-film-like cores of the present invention and is a diagram showing an example in which the width is smaller for the thin-film-like cores farther from the high-refractive-index core.
Figure 20:
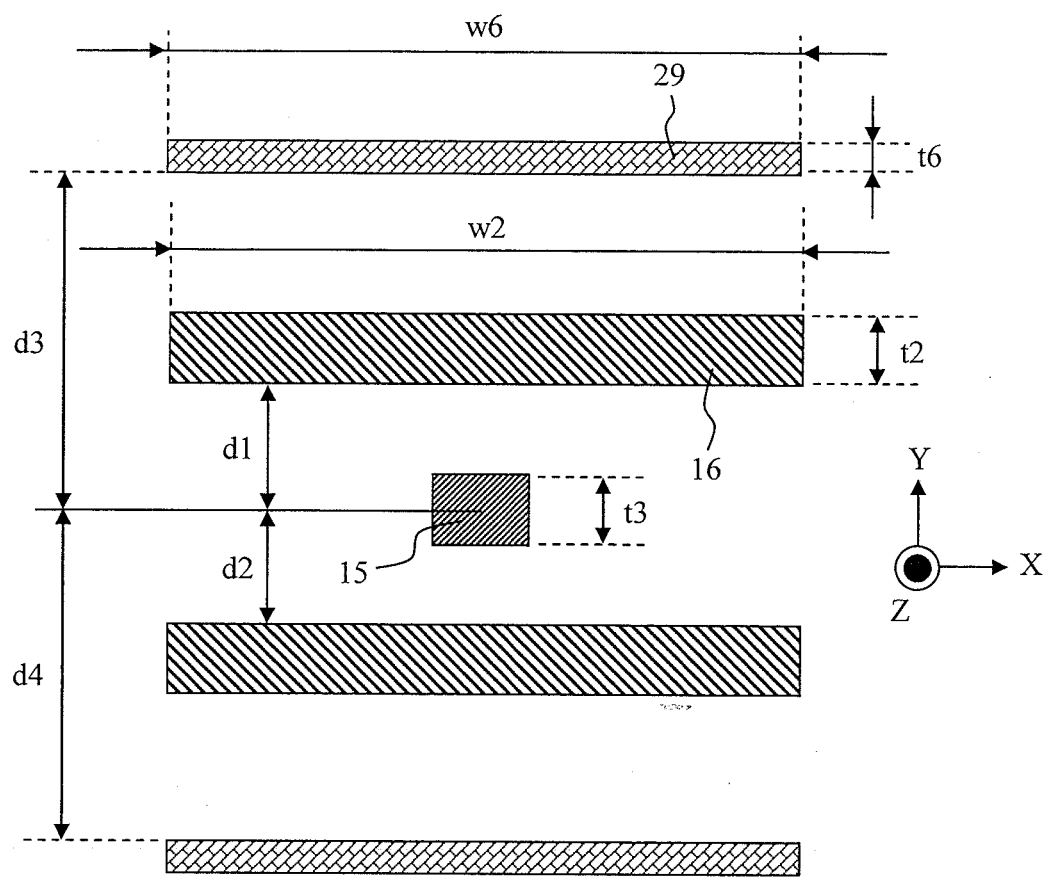
FIG. 20 is a cross-sectional view of the spot size converter including three or more thin-film-like cores of the present invention and is a diagram showing an example in which the thickness is smaller for the thin-film-like cores farther from the high-refractive-index core.

FIGS. 18, 19, and 20 show an embodiment when there are four thin-film-like cores. In the inner thin-film-like cores 16, the width w2 is 2 μm, the thickness t2 is 0.25 μm, Δn is 0.08, and the distance d1+d2 between the thin-film-cores is 1.5 μm. FIG. 18 shows an example in which only Δn of the outer thin-film-like cores 29 is smaller than that of the inner thin-film-like cores 16, Δn is 0.04, and d3 and d4 are 1 μm. FIG. 19 shows an example in which only a width w6 of the outer thin-film-like cores 29 is smaller than that of the inner thin-film-like cores 16, w6 is 1 μm, and d3 and d4 are 1 μm. FIG. 20 shows an example in which only a thickness t6 of the outer thin-film-like cores 29 is smaller than that of the inner thin-film-like cores 16, t6 is 0.15 μm, and d3 and d4 are 1 μm. As a result of the three embodiments, the total optical propagation efficiency 1.15 times that of the spot size converter including the light coupling unit 14 made of two thin-film-like cores 16 is attained.

Although the two outer thin-film-like cores 29 are the same in the description above, the width, the thickness, and the refractive index of the cores may be different. Even if the cores are different, the maximum total optical propagation efficiency can be realized by adjusting the distances d3 and d4 between the thin-film-like cores 29 and the high-refractive-index core 15 as in the embodiment described above. The shape of the thin-film-like core 29 does not have to be flat at all parts on the XY plane, and similar advantages can be obtained even if part of the core is not flat. The case in which the thin-film-like core is distorted as in the shape of the thin-film-like core 26 shown in FIG. 6B is an example.

Figure 21:
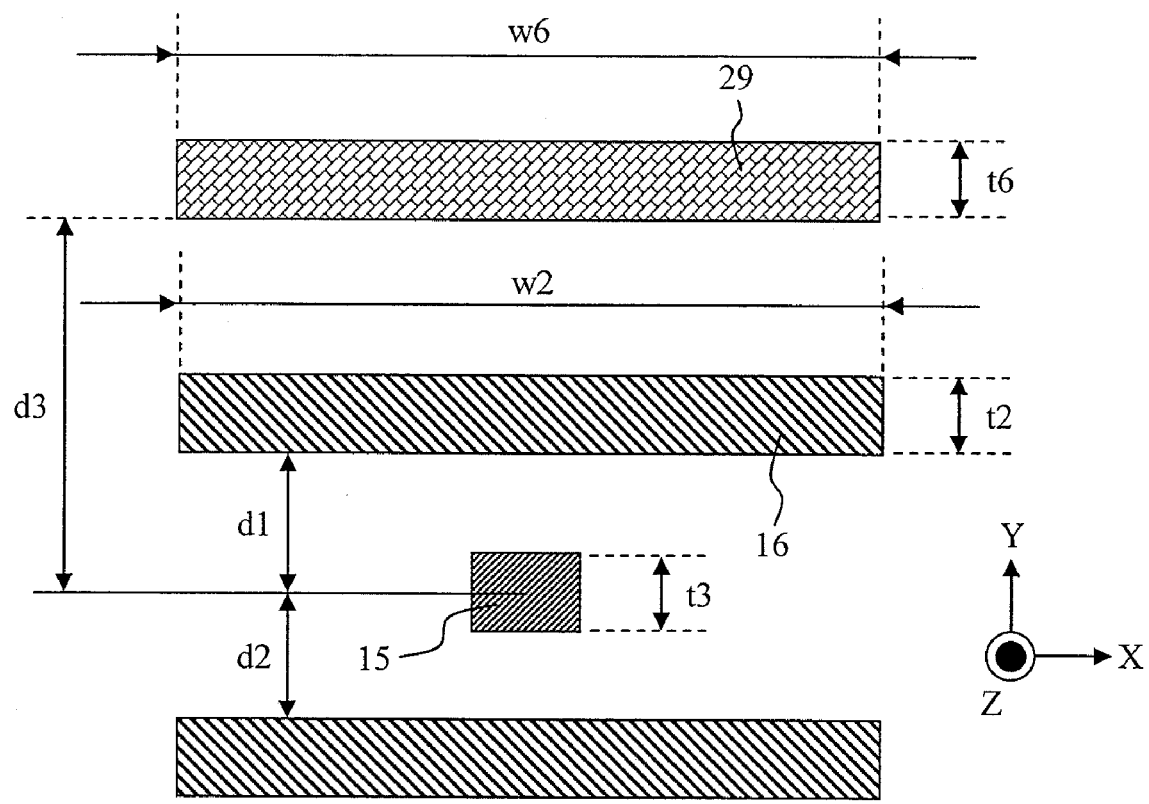
FIG. 21 is a cross-sectional view of the spot size converter including three or more thin-film-like cores of the present invention and is a diagram showing an example in which the numbers of the thin-film-like cores sandwiching the high-refractive-index core are different above and below.

Although the numbers of the thin-film-like cores sandwiching the high-refractive-index core are the same above and below (±Y directions when the high-refractive-index core is the origin) in the description above, the numbers above and below may be different. For example, as shown in FIG. 21, the outer thin-film-like core 29, in which one of the width, the thickness, and Δn of the core is smaller than that of the inner thin-film-like cores 16, may be formed in one of the ±Y directions. The adjustment of the distance (d3 here) between the thin-film-like core 29 and the high-refractive-index core 15 can improve the total optical propagation efficiency.

The BPM method is used to calculate the relationship between the number of thin-film-like cores and the total optical propagation efficiency of the spot size converter to figure out the number of thin-film-like cores necessary to improve the total optical propagation efficiency of the spot size converter. The thin-film-like cores are adjusted as described above so that the value of width×thickness×Δn is 0.02 μm$^2$ or more and 0.045 μm$^2$ or less. As described, at least one of the width, the thickness, and Δn of the thin-film-like cores farther from the high-refractive-index core is adjusted to be smaller than that of the thin-film-like cores closer to the high-refractive-index core. The distances between the thin-film-like cores and the high-refractive-index core are also adjusted to maximize the total optical propagation efficiency. In this case, at least one thin-film-like core is formed in each of the upper direction and the lower direction of the high-refractive-index core.

Figure 22:
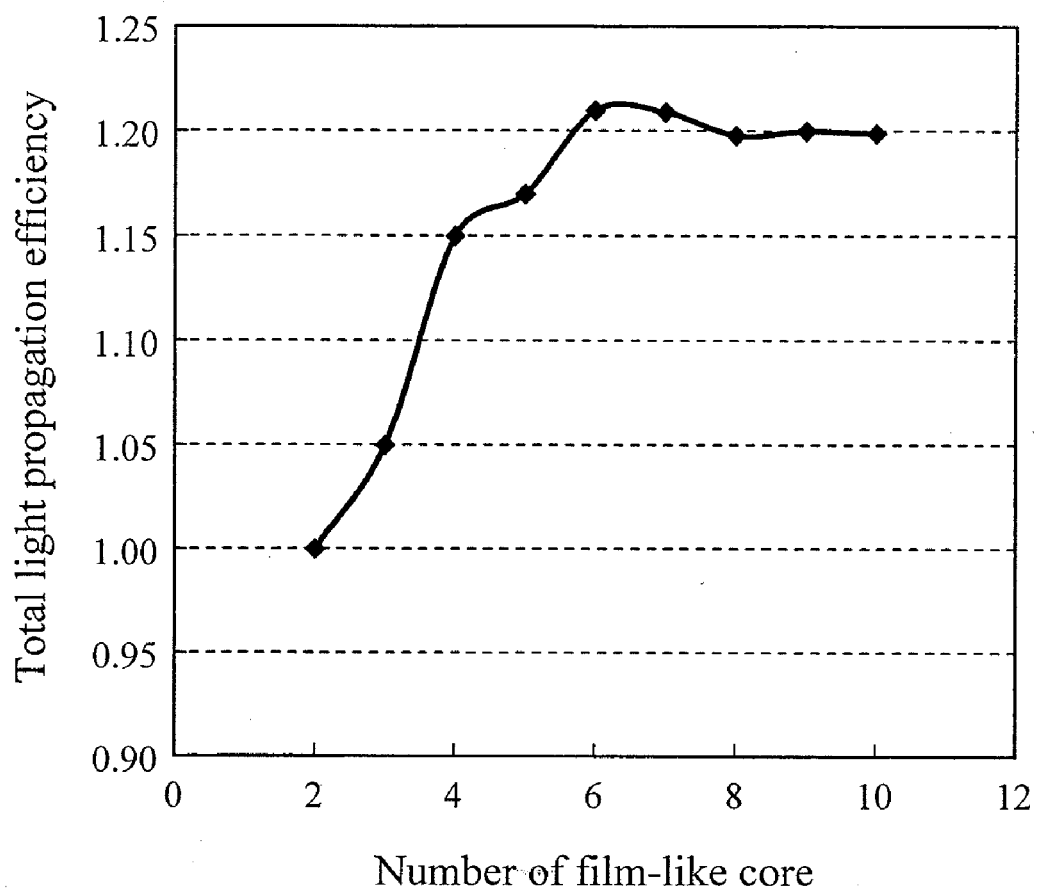
FIG. 22 is a diagram showing a relationship between the total optical propagation efficiency of the spot size converter of the present invention and the number of thin-film-like cores.

FIG. 22 shows the calculation result, and the optical propagation efficiency when there are two thin-film-like cores is standardized as one. As shown in FIG. 22, an improvement in the total optical propagation efficiency is not expected when there are more than six thin-film-like cores. Therefore, the number of the thin-film-like cores may be six at the most.

Figure 25:
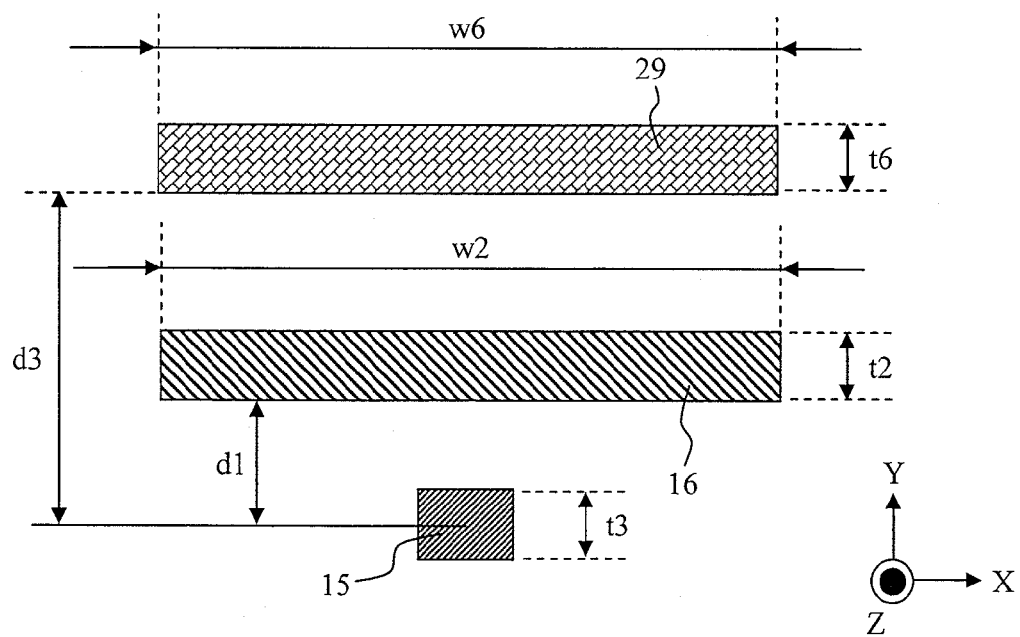
FIG. 25 is a cross-sectional view of the spot size converter including the thin-film-like cores of the present invention and is a diagram showing an example in which the thin-film-like cores are formed only above or below the high-refractive-index core.

Although the thin-film-like cores 16 always sandwich the high-refractive-index core 15 in the spot size converter of the embodiment, the thin-film-like cores may be formed only above or below the high-refractive-index core. In this case, as described above, at least one of the width, the thickness, and Δn of the thin-film-like cores farther from the high-refractive-index core can be adjusted to be smaller than that of the thin-film-like cores closer to the high-refractive-index core. FIG. 25 shows an example of forming two thin-film-like cores only above the high-refractive-index core. At least one of the width w6, the thickness t6, and Δn of the outer thin-film-like core 29 is made smaller than that of the thin-film-like core 16. The distance d1 between the thin-film-like core 16 and the high-refractive-index core 15 and the distance d3 between the thin-film-like core 16 and the high-refractive-index core 15 are adjusted to obtain the maximum total optical propagation efficiency.

Third Embodiment

Another embodiment related to the light source 4 of the embodiments described above will be described.

Figure 26:
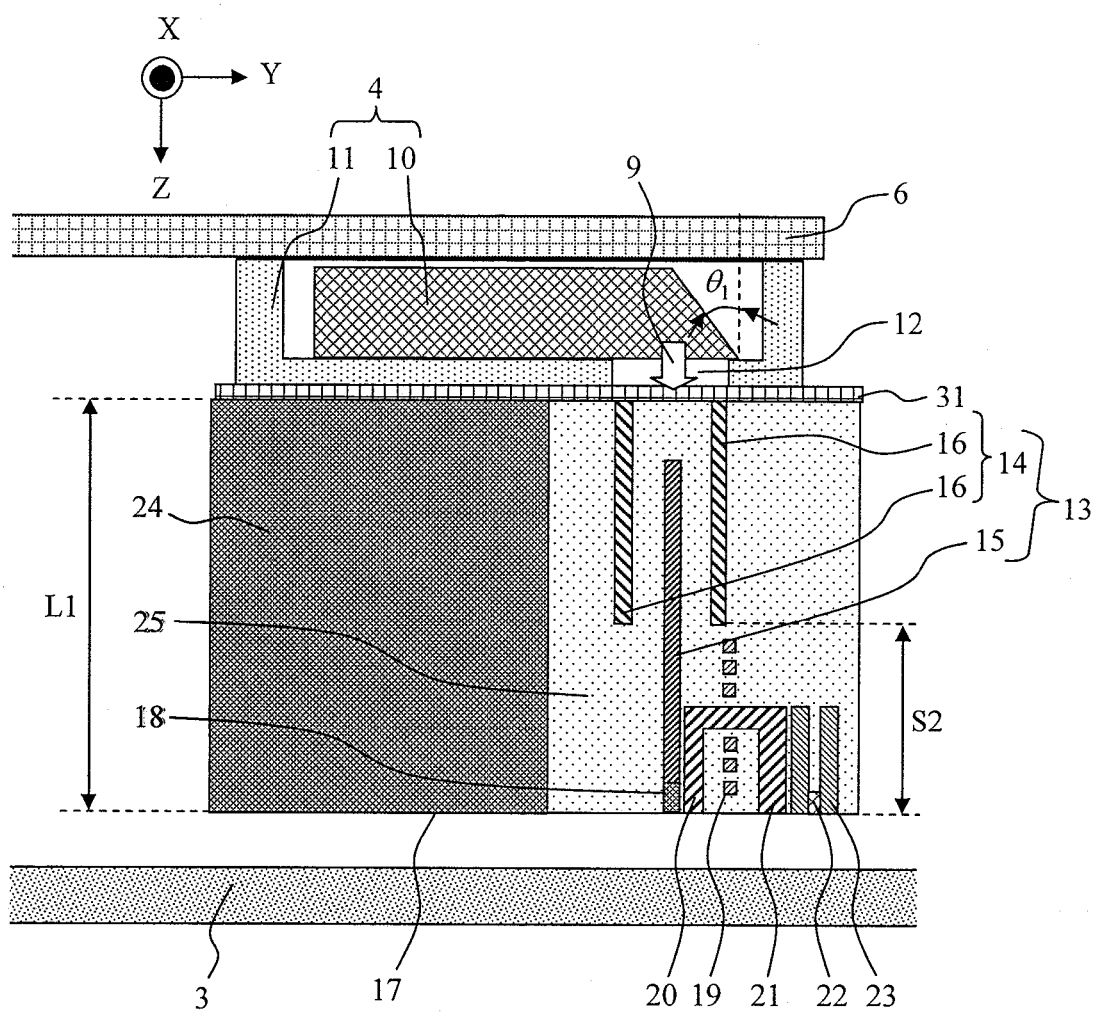
FIG. 26 is a cross-sectional side view near the magnetic head including the spot size converter of the present invention and is a diagram showing an example in which a laser diode and a mount are used for the light source and an antireflection film is applied.

A case in which the light source 4 uses the laser diode 10 mounted on the sub-mount 11 will be described first. As shown in FIG. 26, one end face of the laser diode 10 is processed to set an angle $\theta_1$ to 40 to 45 degrees to reflex the light in the magnetic head bottom surface direction. The light transmission hole 12 is created on the sub-mount 11 to allow the light to enter the spot size converter 13. In this case, an antireflection film 31 is formed below the sub-mount 11, and the light reflected on the magnetic head upper surface can be reduced. Therefore, the return light to the laser diode 10 can be reduced. The clad material 25 or a dielectric, such as $Al_2O_3$, $SiO_xN_y$, $SiO_2$, and $MgF_2$, with lower refractive index than the thin-film-like core 16 can be used for the material of the antireflection film 31. In the present embodiment, $MgF_2$ is used for the material of the antireflection film 31. This is because, to attain the function of the antireflection film, the refractive index of the material of the antireflection film needs to be higher than that on the side of the incident light surface and lower than that on the side of the light emission surface. As a result, the return light to the laser diode 10 can be reduced, and the laser diode 10 can be stably driven.

As in the embodiments described above, the light transmission hole 12 may be filled by a UV curable resin, a thermosetting adhesive, etc. Although the spot size of the incident light 9 enlarges before reaching the spot size converter, the enlargement of the spot size can be prevented because the refractive index of the UV curable resin, the thermosetting adhesive, etc. is higher than that of the air. Therefore, the incident light 9 can be highly efficiently coupled with the light coupling unit 14 of the spot size converter. The UV curable resin, the thermosetting adhesive, etc. can also function as an adhesive for bonding the sub-mount 10 and the magnetic head. In this case, for the material of the antireflection film 31, it is preferable to use a dielectric with higher refractive index than the UV curable resin, the thermosetting adhesive, etc. and lower refractive index than the clad material 25 or the thin-film-like core 16.

Figure 27:
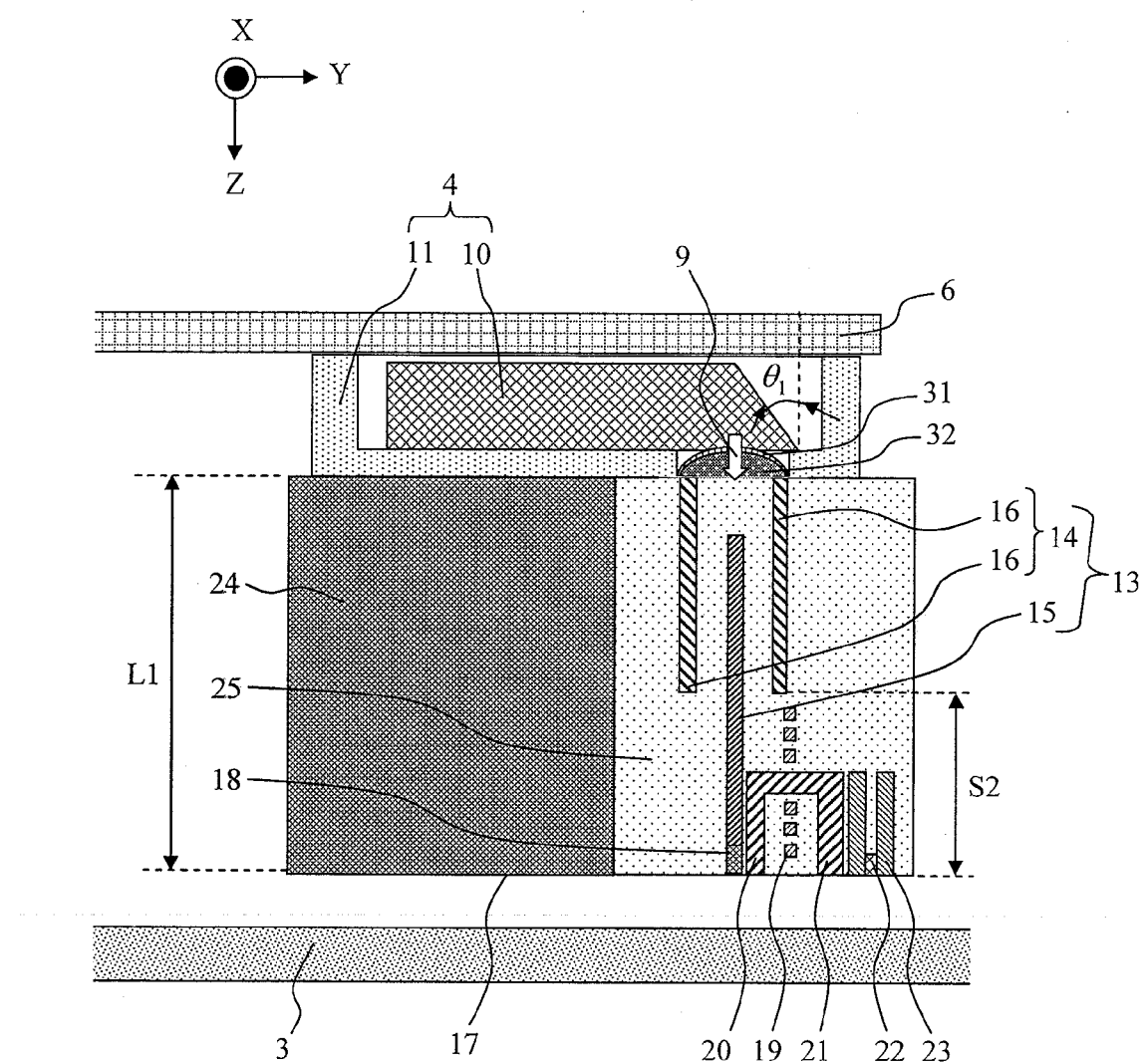
FIG. 27 is a cross-sectional side view near the magnetic head including the spot size converter of the present invention and is a diagram showing an example in which a laser diode and a mount are used for the light source and a condenser lens including an antireflection film is applied.

Although the antireflection film 31 is formed below the sub-mount 10 in the embodiments described above, a small condenser lens 32 may be formed on the magnetic head upper surface as shown in FIG. 27, and the antireflection film 31 may be formed on the surface. In the present embodiment, the condenser lens 32 is formed directly above the light coupling unit 14, and the sub-mount 11 is set to place the condenser lens 32 in the light transmission hole 12. The spot size of the incident light 9 is reduced by the condenser lens 32 before entering the spot size converter 13. Therefore, the incident light 9 can be highly efficiently coupled with the light coupling unit 14 of the spot size converter. Since the numerical aperture of a small condenser lens is small, the spot size cannot be significantly reduced. However, the spot size can be made smaller than when there is no condenser lens. As a result, the total optical propagation efficiency of the spot size converter can be improved. Since the antireflection film 31 is formed on the surface of the condenser lens 32, the return light to the laser diode 10 can be reduced, and the laser diode 10 can be stably driven. For the material of the antireflection film 31, a dielectric, such as $Al_2O_3$, $SiO_xN_y$, and $SiO_2$, with lower refractive index than the material of the condenser lens 32 can be used. In the present embodiment, $SiO_xN_y$ is used for the material of the antireflection film 31. This is because, to attain the function of the antireflection film, the refractive index of the material of the antireflection film needs to be higher than that on the side of the incident light surface and lower than that on the side of the light emission surface.

The parts of the light transmission hole 12 other than the antireflection film 31 and the condenser lens 32 may be filled by a UV curable resin, a thermosetting adhesive, etc. This is because not only a function of preventing the enlargement of the spot size of the incident light 9, but also a function as an adhesive for bonding the sub-mount 11 and the magnetic head can be attained. In this case, for the material of the antireflection film 31, it is preferable to use a dielectric with higher refractive index than the UV curable resin, the thermosetting adhesive, etc. and lower refractive index than the condenser lens 32.

Figure 28:
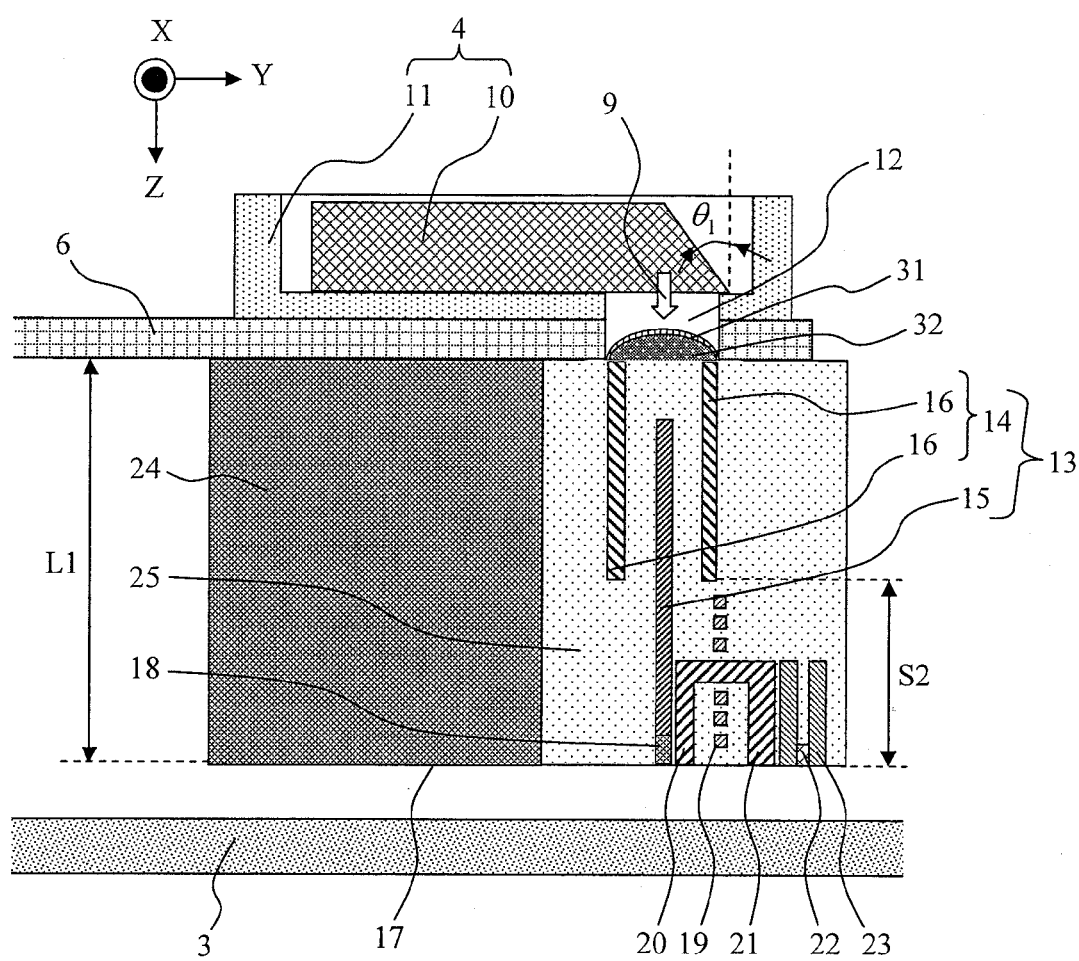
FIG. 28 is a cross-sectional side view near the magnetic head including the spot size converter of the present invention and is a diagram showing an example of using a laser diode and a mount for the light source arranged on a suspension.

Although the light source 4 is arranged between the suspension 6 and the magnetic head in the embodiments, the light source 4 may be arranged on the suspension 6 as shown in FIG. 28. The surface area of the suspension 6 is larger than the magnetic head. Therefore, if the light source 4 is arranged on the suspension, the heat generated from the light source 4 can be efficiently released through the suspension 6. In this case, the light transmission hole 12 also needs to be created in the suspension 6. As in the embodiments described above, the small condenser lens 32 is formed directly above the light coupling unit 14 in the present embodiment to increase the coupling efficiency of the incident light 9 and the light coupling unit 14 of the spot size converter. The antireflection film 31 is formed on the surface of the condenser lens 32 to reduce the return light to the laser diode 10.

As in the embodiments, parts of the light transmission hole 12 other than the antireflection film 31 and the condenser lens 32 may be filled by a UV curable resin, a thermosetting adhesive, etc. to prevent the enlargement of the spot size of the incident light 9.

Figure 29:
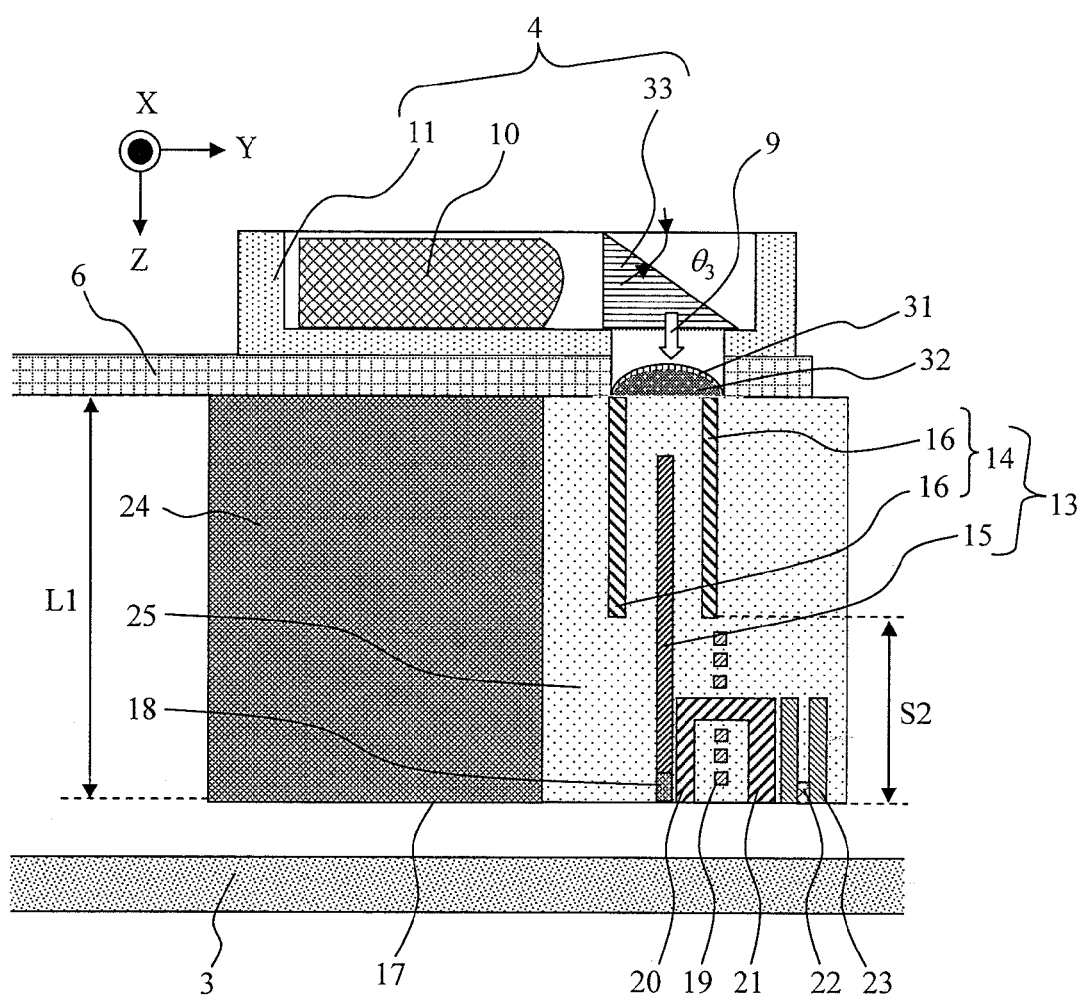
FIG. 29 is a cross-sectional side view near the magnetic head including the spot size converter of the present invention and is a diagram showing an example of using a laser diode, a mirror, and a mount for the light source.

Although one end face of the laser diode 10 is processed to reflex the light in the direction of the magnetic head bottom surface in the embodiments, a mirror 33 may be formed in the sub-mount 11 as shown in FIG. 29 to reflex the light. Such a light source 4 does not require processing of an end face of the laser diode, and a more inexpensive laser diode can be used. In this case, the surface where the light of the laser diode 10 is emitted can be circularly processed to prevent the enlargement of the light. A dielectric with less light absorption can be used for the material of the mirror 33, and one end face of the mirror 33 can be processed to set an angle $\theta_3$ to 40 to 45 degrees.

As in the embodiments described above, the small condenser lens 32 is formed directly above the light coupling unit 14 in the present embodiment to increase the coupling efficiency of the incident light 9 and the light coupling unit 14 of the spot size converter. The antireflection film 31 is formed on the surface of the condenser lens 32 to reduce the return light to the laser diode 10.

As in the embodiments, parts of the light transmission hole 12 other than the antireflection film 31 and the condenser lens 32 may be filled by a UV curable resin, a thermosetting adhesive, etc. to prevent the enlargement of the spot size of the incident light 9.

Figure 30:
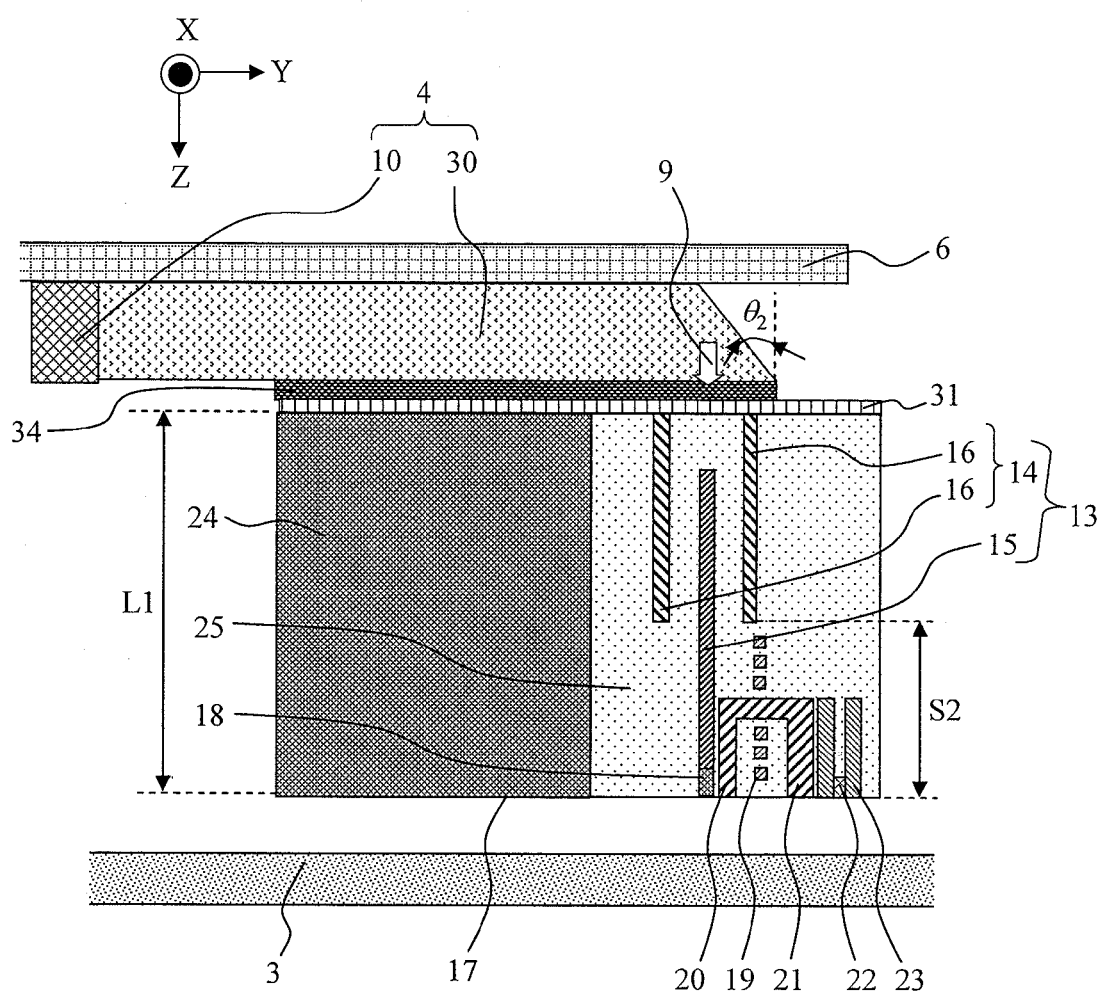
FIG. 30 is a cross-sectional side view near the magnetic head including the spot size converter of the present invention and is a diagram showing an example in which a laser diode and a waveguide are used for the light source and an antireflection film is applied.

A case in which the light source 4 is constituted by the laser diode 10 and the waveguide 30 will be described. As shown in FIG. 30, one end face of the waveguide 30 is processed to set the angle $\theta_2$ to 40 to 45 degrees to allow the light to reflex in the direction of the magnetic head bottom surface and enter the spot size converter 13. Such a light source 4 does not require processing of the end face of the laser diode, and a relatively inexpensive laser diode with better versatility can be used. In this case, the antireflection film 31 can be formed on the upper surface of the magnetic head to reduce the light reflected by the upper surface of the magnetic head to reduce the return light to the laser diode 10. The antireflection film 31 and the waveguide 30 are bonded by an adhesive 34 such as a UV curable resin and a thermosetting adhesive. For the material of the antireflection film 31, a dielectric, such as $Al_2O_3$, $SiO_xN_y$, and $SiO_2$, with higher refractive index than the adhesive 34 and lower refractive index than the clad material 25 or the thin-film-like core 16 can be used. In the present embodiment, $SiO_xN_y$ is used for the material of the antireflection film 31. This is because the refractive index of the material of the antireflection film needs to be higher than that on the side of the incident light surface and lower than that on the side of the light emission surface to attain the function as the antireflection film. As a result, the return light to the laser diode 10 can be reduced, and the laser diode 10 can be stably driven.

Figure 31:
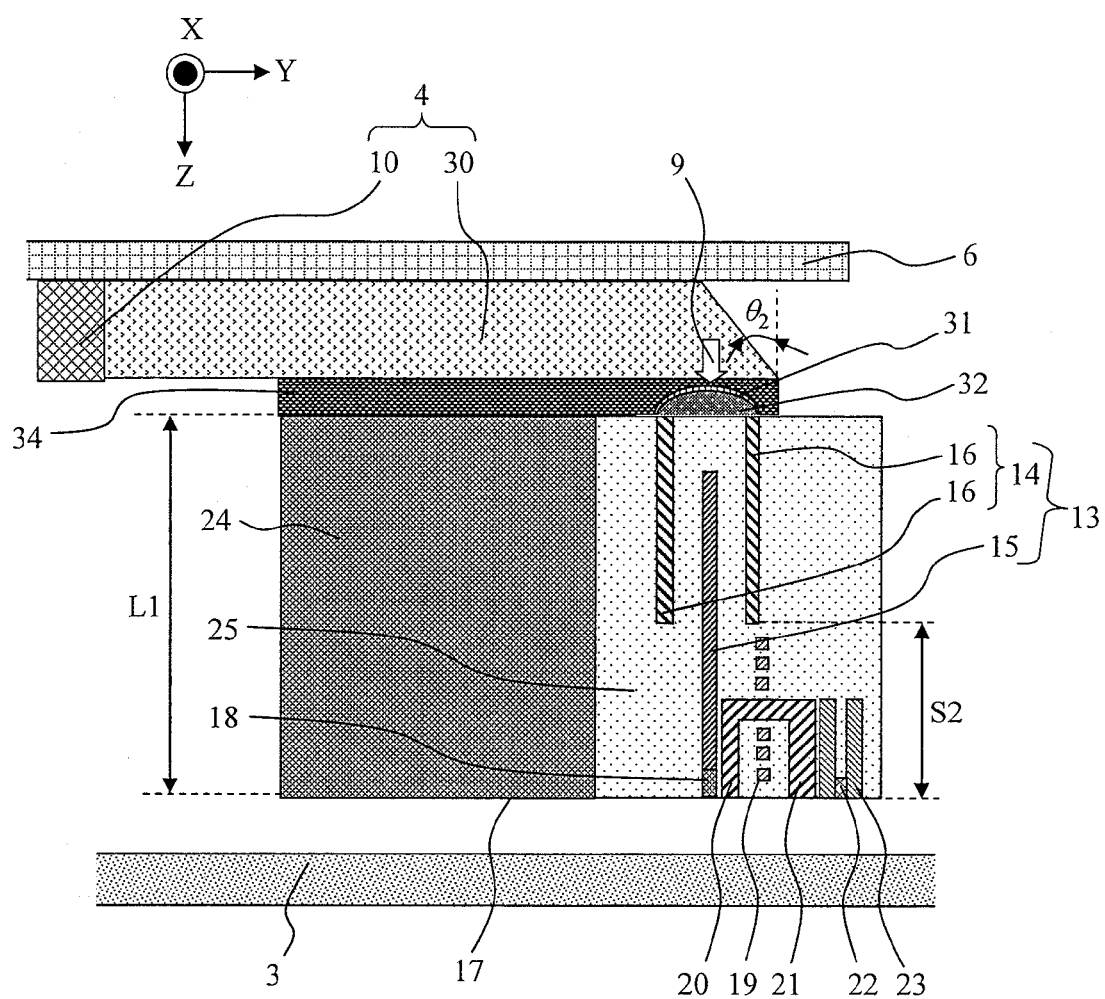
FIG. 31 is a cross-sectional side view near the magnetic head including the spot size converter of the present invention and is a diagram showing an example in which a laser diode and a waveguide are used for the light source and a condenser lens including an antireflection film is applied.

The antireflection film 31 is formed on the magnetic head in the embodiments. However, as shown in FIG. 31, the small condenser lens 32 may be formed on the upper surface of the magnetic head, and the antireflection film 31 may be formed on the surface of the condenser lens 32. In the present embodiment, the condenser lens 32 is formed directly above the light coupling unit 14, the waveguide 30 is aligned to pass the light emitted from the waveguide 30 (incident light 9) through the condenser lens, and the waveguide 30 is fixed by the adhesive 34. The condenser lens 32 reduces the spot size of the incident light 9 before entering the spot size converter 13. Therefore, the incident light 9 can be highly efficiently coupled with the light coupling unit 14 of the spot size converter. Since the numerical aperture of a small condenser lens is small, the spot size cannot be significantly reduced. However, the spot size can be made smaller than when there is no condenser lens. As a result, the total optical propagation efficiency of the spot size converter can be improved. Since the antireflection film 31 is formed on the surface of the condenser lens 32, the return light to the laser diode 10 can be reduced, and the laser diode 10 can be stably driven. For the material of the antireflection film 31, a dielectric, such as $Al_2O_3$, $SiO_xN_y$, and $SiO_2$, with higher refractive index than the adhesive 34 and lower refractive index than the material of the condenser lens 32 can be used. In the present embodiment $SiO_xN_y$ is used for the material of the antireflection film 31. This is because the refractive index of the material of the antireflection film needs to be higher than that on the side of the incident light surface and lower than that on the side of the light emission surface to attain the function as the antireflection film.

Figure 32:
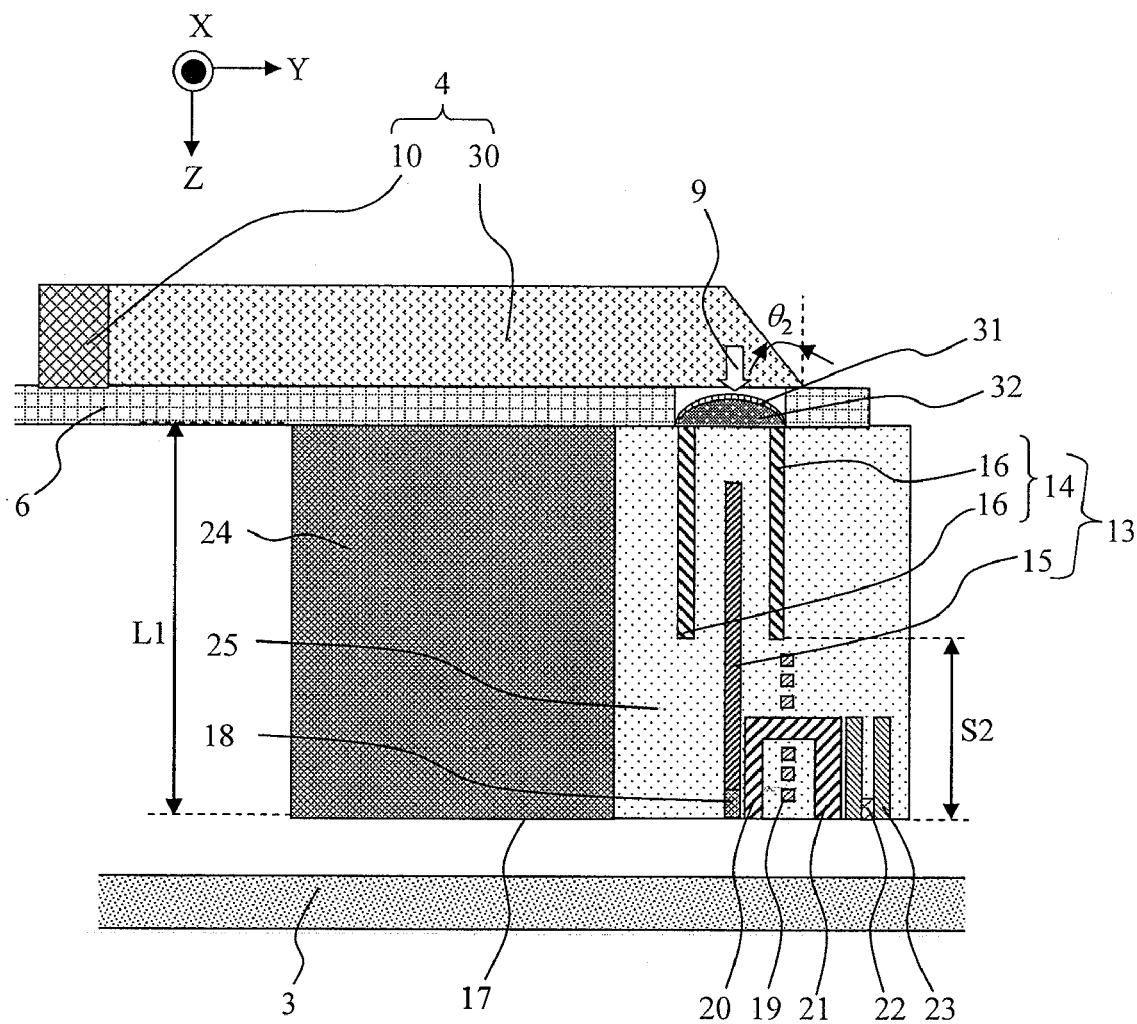
FIG. 32 is a cross-sectional side view near the magnetic head including the spot size converter of the present invention and is a diagram showing an example of using a laser diode and a waveguide for the light source arranged on a suspension.

In the embodiments, the light source 4 is arranged between the suspension 6 and the magnetic head when the small condenser lens 32 is formed directly above the light coupling unit 14. However, as shown in FIG. 32, the light source 4 may be arranged on the suspension 6. According to the configuration of the present embodiment, the adhesive 34 does not have to be thick when the waveguide 30 and the magnetic head are bonded as shown in FIG. 31. This is advantageous in that the light source can be aligned with relatively little consideration for the optical axis misalignment during adhesive setting. In this case, a light transmission hole needs to be created on the suspension 6. As in the embodiments, the antireflection film 31 is formed on the surface of the condenser lens 32 in the present embodiment to reduce the return light to the laser diode 10.

Parts of the light transmission hole 12 other than the antireflection film 31 and the condenser lens 32 may be filled by a UV curable resin, a thermosetting adhesive, etc. to prevent the enlargement of the spot size of the incident light 9. For the material of the antireflection film 31, a dielectric, such as $Al_2O_3$, $SiO_xN_y$, and $SiO_2$, with higher refractive index than the adhesive 34 and lower refractive index than the material of the condenser lens 32 can be used. In the present embodiment $SiO_xN_y$ is used for the material of the antireflection film 31. This is because the refractive index of the material of the antireflection film needs to be higher than that on the side of the incident light surface and lower than that on the side of the light emission surface to attain the function as the antireflection film.

Figure 33:
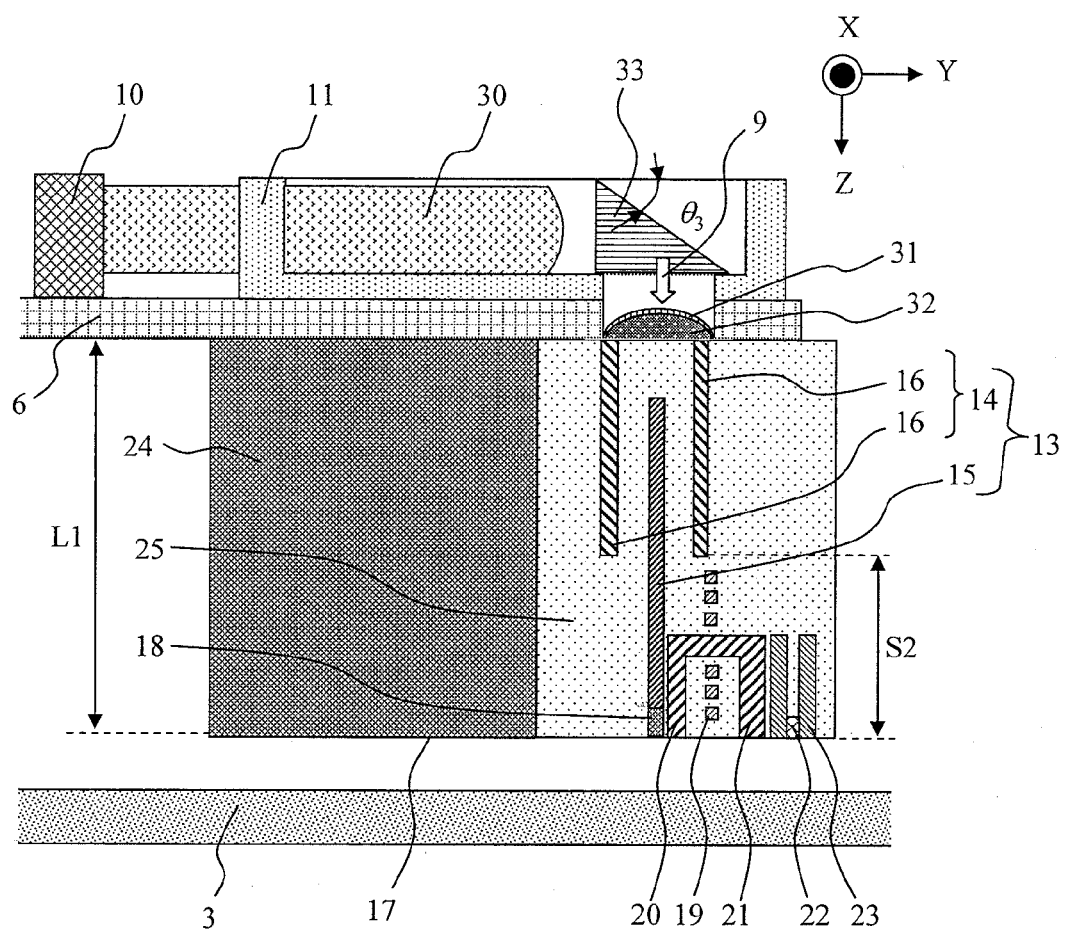
FIG. 33 is a cross-sectional side view near the magnetic head including the spot size converter of the present invention and is a diagram showing an example of using a laser diode, a waveguide, a mirror, and a mount for the light source.

In the embodiments, one end face of the waveguide 30 is processed to reflex the light in the direction of the magnetic head bottom surface. However, as shown in FIG. 33, the waveguide 30 may be mounted on the sub-mount 11 including the light transmission hole to form the mirror 33 in the sub-mount 11 to reflex the light. Such a configuration allows handling the waveguide 30 with the sub-mount, and the configuration is advantageous in that the optical axis alignment is easy. In this case, the surface where the light of the waveguide 30 is emitted can be circularly processed to prevent the enlargement of the light. A dielectric with less light absorption is suitable for the material of the mirror 33, and one end face of the mirror 33 can be processed to set the angle $\theta_3$ to 40 to 45 degrees.

Figure 34:
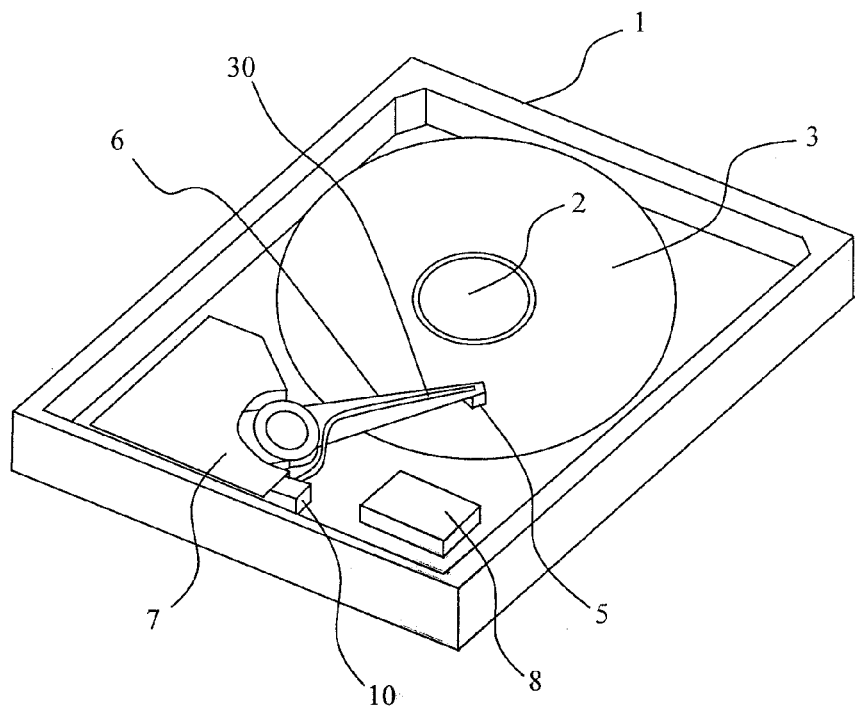
FIG. 34 is a schematic diagram of main parts showing an example of the magnetic recording system of the present invention and is a diagram showing an example in which a laser diode is arranged at a place other than the suspension.

In the embodiments, although the laser diode 10 is arranged at the root of the suspension 6, the laser diode 10 may be arranged next to the voice coil motor 7 or next to the signal processing LSI. According to the configuration, there is room for an installation space of the laser diode 10. Therefore, a compulsory cooling mechanism, such as a Peltier element, can be implemented on the laser diode, and more stable drive and a long lifetime of the laser diode are possible. In the present embodiment, as shown in FIG. 34, the laser diode 10 is arranged near the voice coil motor 7, or for example, next to the voice coil motor 7, and the waveguide 30 is led to the magnetic head upper surface over the suspension 6.

Fourth Embodiment

Another embodiment related to the arrangement of the high-refractive-index core 15, the magnetic main pole 20, and the magnetic return pole 21 will be described.

Figure 35:
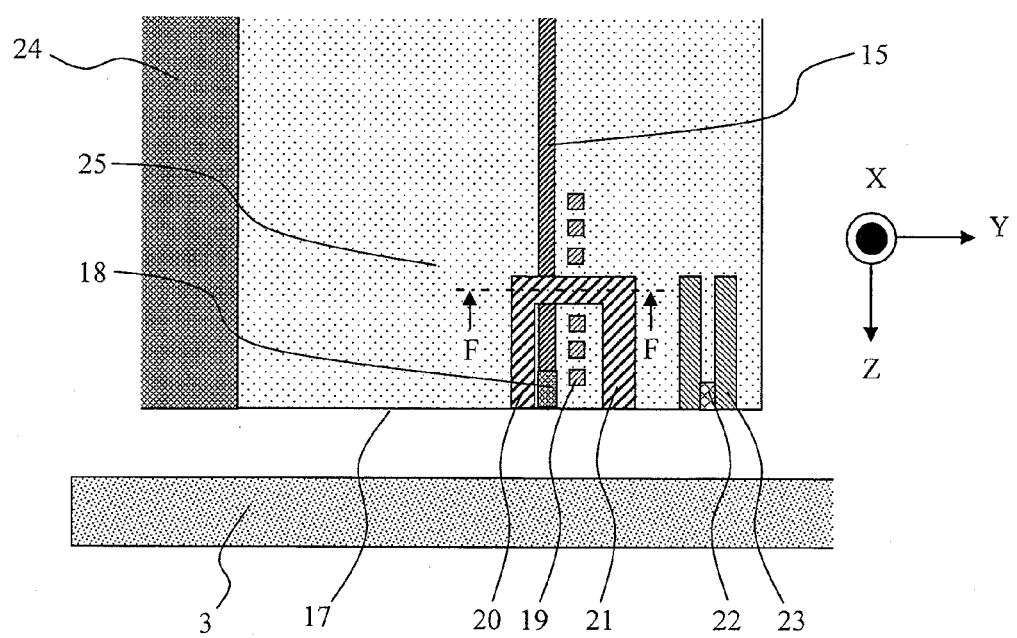
FIG. 35 is a cross-sectional side view near the magnetic head bottom surface including the spot size converter of the present invention and is a diagram showing an example in which the high-refractive-index core is formed between a magnetic main pole and a magnetic return pole.

In the embodiments described above, the magnetic field generated from the magnetic main pole 20 is led to the terminal portion of the high-refractive-index core 15 by forming the high-refractive-index core 15 next to the magnetic main pole 20 as shown in FIG. 1. The magnetic field can also be led to the terminal portion of the high-refractive-index core 15 by forming the high-refractive-index core 15 between the magnetic main pole 20 and the magnetic return pole 21. FIG. 35 is an enlarged cross-sectional view near the magnetic head bottom surface 17 of the present embodiment. As shown in FIG. 35, the high-refractive-index core 15 can be formed near the magnetic main pole 20. This is because a part with steep magnetic gradient of the magnetic field generated from the magnetic main pole 20 can be used for thermal-assisted magnetic recording, and a smaller magnetic recording mark can be formed on the magnetic recording medium 3. In the present embodiment, the distance between the high-refractive-index core 15 and the magnetic main pole 20 is 200 nm or less. It is preferable that the clad material between the magnetic main pole 20 and the high-refractive-index core 15 is a material with lower refractive index than the clad material 25 to prevent the light absorption by the magnetic main pole 20. In this way, the light is more surely confined in the high-refractive-index core 15. For the same reason, it is preferable that the clad material between the magnetic main pole 20 and the high-refractive-index core 15 in the case of FIG. 1 is also a material with refractive index lower than the clad material 25. In the present embodiment, the clad material between the magnetic main pole 20 and the high-refractive-index core 15 is $SiO_2$ when the clad material 25 is $Al_2O_3$.

Figure 36A:
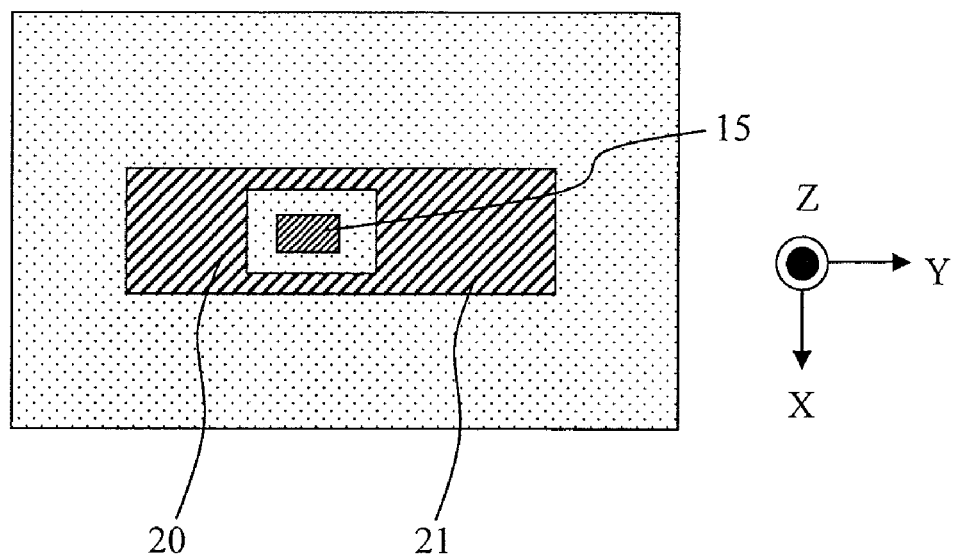
FIGS. 36A and 36B are cross-sectional views of a magnetic head magnetic pole portion including the spot size converter of the present invention, FIG. 36A being a diagram showing an example in which a hole is created at the magnetic pole and the high-refractive-index core is formed between the magnetic main pole and the magnetic return pole, FIG. 36B being a diagram showing an example in which the magnetic pole is bent and the high-refractive-index core is formed between the magnetic main pole and the magnetic return pole.
Figure 36B:
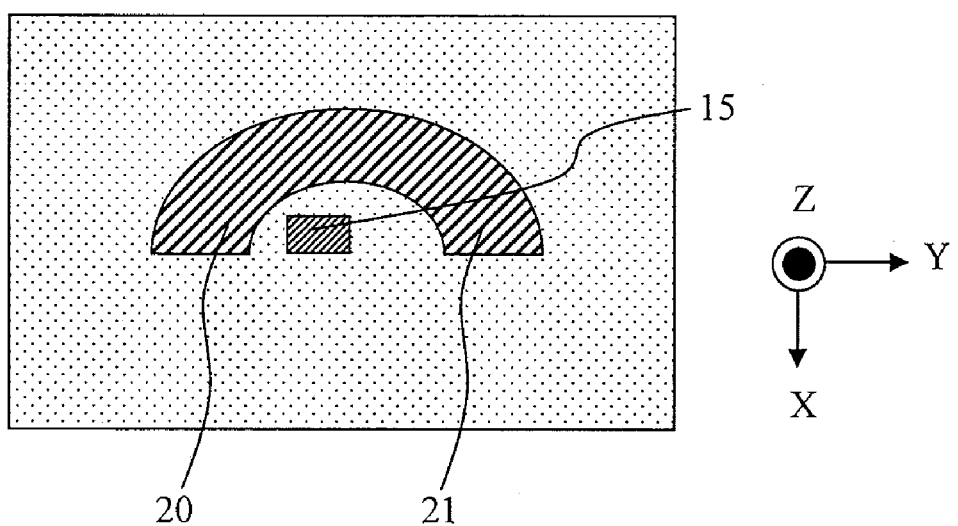

FIGS. 36A and 36B are F-F cross-sectional views of FIG. 35, and FIGS. 36A and 36B illustrate magnetic pole structures for arranging the high-refractive-index core 15 between the magnetic main pole 20 and the magnetic return pole 21. In the present embodiment, as shown in FIG. 36A, a hole is arranged at part of the magnetic pole, and the high-refractive-index core 15 is arranged through the hole. A clad material is formed around the high-refractive-index core 15. It is preferable that the clad material between the magnetic pole and the high-refractive-index core 15 is a material with lower refractive index than the clad material 25 to prevent the light absorption by the magnetic pole.

In the present embodiment, as shown in FIG. 36B, the magnetic pole is formed in a circular shape to arrange the high-refractive-index core 15 between the magnetic main pole 20 and the magnetic return pole 21. In this way, the high-refractive-index core 15 can be formed near the magnetic main pole 20 without disrupting the magnetic flow from the magnetic return pole 21 to the magnetic main pole 20. In this case, it is also preferable that the clad material between the magnetic pole and the high-refractive-index core 15 is a material with lower refractive index than the clad material 25.

Figure 37:
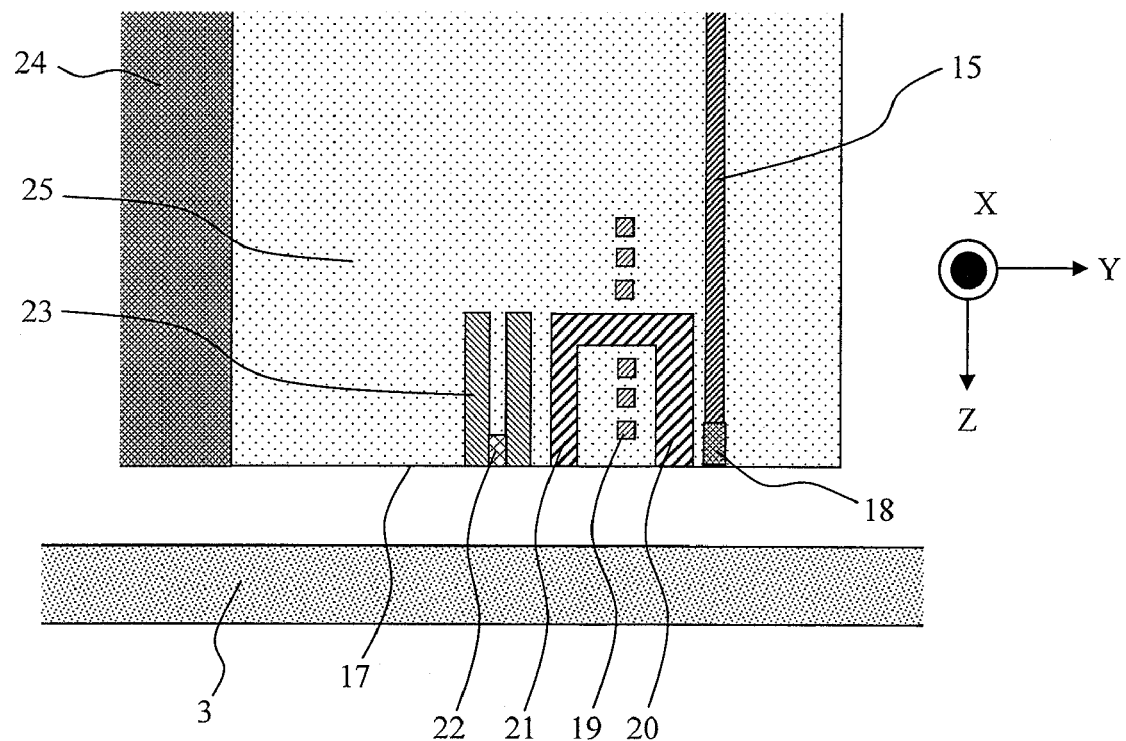
FIG. 37 is a cross-sectional side view near the magnetic head bottom surface including the spot size converter of the present invention and is a diagram showing a case in which a magnetic reproducing element is formed near a magnetic head base material.

In the embodiments, the magnetic reproducing element 22 is formed at a location farther than the magnetic main pole 20 and the magnetic return pole 21 from the magnetic head base material 24 (such as AlTiC) as shown in FIG. 1. However, similar advantages as the embodiments can be obtained by forming the magnetic reproducing element 22 at a location close to the magnetic head base material 24 and then forming the magnetic return pole 21 and the magnetic main pole 20 as shown in FIG. 37. In the present embodiment, the high-refractive-index core 15 is formed next to the magnetic main pole 20. The high-refractive-index core 15 may be formed between the magnetic return pole 21 and the magnetic main pole 20 as in the embodiments.

DESCRIPTION OF SYMBOLS

| | |
|---|---|
| 1 | housing |
| 2 | spindle |
| 3 | magnetic recording medium |
| 4 | light source |
| 5 | magnetic head |
| 6 | suspension |
| 7 | voice coil motor |
| 8 | signal processing LSI |
| 9 | incident light |
| 10 | laser diode |
| 11 | sub-mount |
| 12 | light transmission hole |
| 13 | spot size converter |
| 14 | light coupling unit |
| 15 | high-refractive-index core |
| 16 | thin-film-like core |
| 17 | magnetic head bottom surface |
| 18 | near-field-light generator |
| 19 | thin film coil |
| 20 | magnetic main pole |
| 21 | magnetic return pole |
| 22 | magnetic reproducing element |
| 23 | shield |
| 24 | magnetic head base material |
| 25 | clad material |
| 26 | thin-film-like core in which shape of cross section is not flat |
| 27 | light spot propagating through thin-film-like core |
| 28 | light spot propagating through high-refractive-index core |
| 29 | outer thin-film-like core |
| 30 | waveguide |
| 31 | antireflection film |
| 32 | condenser lens |
| 33 | mirror |
| 34 | adhesive |

What is claimed is:

1. A thermal-assisted-magnetic-recording head comprising:
   a magnetic main pole configured to generate a recording magnetic field;
   a magnetic return pole;
   a magnetic reproducing element;
   a shield formed around the magnetic reproducing element; and
   a light directing unit configured to emit light from a light source as a minute light spot from a location adjacent to the magnetic main pole near an air bearing surface, the light directing unit including:
      a light coupling unit configured to guide the light from the light source into a magnetic head, and
      a high-refractive-index core configured to couple with the light guided by the light coupling unit; and
   wherein the light coupling unit comprises a plurality of thin-film-like cores that have higher refractive index than the clad material and that are separated from each other by the clad material; and
   wherein the width, the thickness, or the refractive index of a thin-film-like core is selected so that the exudation of the propagating light is larger when the thin-film-like core is farther from the high-refractive-index core.

2. The thermal-assisted-magnetic-recording head according to claim 1,
   wherein the thin-film-like core has a width or a thickness configured to allow a mode in which the light propagating along the thin-film-like core significantly exudes from the thin-film-like core, and the thin-film-like core extends from an upper surface of the magnetic head toward the air bearing surface up to a location not reaching the air bearing surface.

3. The thermal-assisted-magnetic-recording head according to claim 1, wherein the refractive index of the high-refractive-index core is higher than the refractive index of the thin-film-like core, and the width and the thickness of the high-refractive-index core is 0.05 µm or more and 0.5 µm or less.

4. The thermal-assisted-magnetic-recording head according to claim 1,
wherein part of an area of the high-refractive-index core near the light source is placed between two thin-film-like cores of the light coupling unit.

5. The thermal-assisted-magnetic-recording head according to claim 1,
wherein the width of the high-refractive-index core gradually becomes smaller as it becomes further from the air bearing surface.

6. The thermal-assisted-magnetic-recording head according to claim 1,
wherein an interval between each thin-film-like core of the light coupling unit and the high-refractive-index core is plus or minus 20% of a value of a half of a half width of the spot size of the light guided through each thin-film-like core, at a location farthest from the air bearing surface of the high-refractive-index core.

7. The thermal-assisted-magnetic-recording head according to claim 1,
wherein the light source is arranged on a surface opposite the air bearing surface, and the light source oscillates in a single mode.

8. The thermal-assisted-magnetic-recording head according to claim 1, further comprising:
a near-field-light generator near the air bearing surface;
wherein the light guided through the high-refractive-index core is directed to the near-field-light generator.

9. The thermal-assisted-magnetic-recording head according to claim 8,
wherein the near-field-light generator is constituted by a triangular metal film or a metal film including a C-shaped or V-shaped opening as seen from the air bearing surface.

10. A magnetic recording system comprising:
a magnetic recording medium;
a medium driving unit configured to drive the magnetic recording medium;
a magnetic head including:
a magnetic main pole configured to generate a recording magnetic field,
a magnetic return pole,
a magnetic reproducing element,
a shield formed around the magnetic reproducing element, and
a light directing unit configured to emit light from a light source as a minute light spot from a location adjacent to the magnetic main pole near an air bearing surface, the light directing unit including:
a light coupling unit configured to guide the light from the light source into a magnetic head; and
a high-refractive-index core configured to couple with the light guided by the light coupling unit; and a magnetic head driving unit configured to position the magnetic head on the magnetic recording medium;
wherein the light coupling unit comprises a plurality of thin-film-like cores that have higher refractive index than the clad material and that are separated from each other by the clad material; and
wherein the width, the thickness, or the refractive index of a thin-film-like core is selected so that the exudation of the propagating light is larger when the thin-film-like core is farther from the high-refractive-index core.

11. The magnetic recording system according to claim 10,
wherein the thin-film-like core has a width or a thickness configured to allow a mode in which the light propagating along the thin-film-like core significantly exudes from the thin-film-like core, and the thin-film-like core extends from an upper surface of the magnetic head toward the air bearing surface up to a location not reaching the air bearing surface.

12. The magnetic recording system according to claim 10,
wherein the refractive index of the high-refractive-index core is higher than the refractive index of the thin-film-like core, and the width and the thickness of the high-refractive-index core is 0.05 µm or more and 0.5 µm or less.

13. The magnetic recording system according to claim 10,
wherein the magnetic head is fixed at a tip portion of a suspension, the light source includes a laser diode and a waveguide, the laser diode is arranged on the suspension or near the magnetic head driving unit, the laser diode is coupled with one end of the waveguide, the other end of the waveguide is arranged on an upper part of the magnetic head, the laser diode oscillates in a single mode, and the waveguide guides the light in the single mode.

14. A thermal-assisted-magnetic-recording head comprising:
a magnetic main pole configured to generate a recording magnetic field;
a magnetic return pole;
a magnetic reproducing element;
a shield formed around the magnetic reproducing element; and
a light directing unit configured to emit light from a light source as a minute light spot from a location adjacent to the magnetic main pole near an air bearing surface, the light directing unit including:
a light coupling unit configured to guide the light from the light source into a magnetic head, and
a high-refractive-index core configured to couple with the light guided by the light coupling unit;
wherein the light coupling unit comprises a plurality of thin-film-like cores that have higher refractive index than the clad material and that are separated from each other by the clad material; and
wherein part of an area of the high-refractive-index core near the light source is placed between two thin-film-like cores of the light coupling unit.

* * * * *